(12) United States Patent
Nakabayashi et al.

(10) Patent No.: US 9,446,669 B2
(45) Date of Patent: Sep. 20, 2016

(54) WORK VEHICLE AND WORK VEHICLE CONTROL METHOD

(71) Applicant: KOMATSU LTD., Tokyo (JP)

(72) Inventors: Masanobu Nakabayashi, Komatsu (JP); Shunsuke Miyamoto, Atsugi (JP); Yasuki Kishimoto, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/903,380

(22) PCT Filed: Jul. 22, 2014

(86) PCT No.: PCT/JP2014/069319
§ 371 (c)(1),
(2) Date: Jan. 7, 2016

(87) PCT Pub. No.: WO2015/079737
PCT Pub. Date: Jun. 4, 2015

(65) Prior Publication Data
US 2016/0144720 A1    May 26, 2016

(30) Foreign Application Priority Data
Nov. 26, 2013    (JP) ................................ 2013-244302

(51) Int. Cl.
*B60L 3/12* (2006.01)
*E02F 9/26* (2006.01)
(Continued)

(52) U.S. Cl.
CPC . *B60L 3/12* (2013.01); *B60K 6/22* (2013.01); *B60K 6/365* (2013.01); *B60K 6/387* (2013.01);
(Continued)

(58) Field of Classification Search
CPC ............ B60L 3/00; B60L 3/12; B60L 11/18; B60K 6/22; B60K 6/50; E02F 9/20; E02F 9/26

USPC ..................... 701/22, 36; 320/109, 103, 132
See application file for complete search history.

(56) References Cited

U.S. PATENT DOCUMENTS 6,232,729 B1    5/2001  Inoue
2002/0074856 A1*  6/2002  Suzuki ................... B60T 13/22
                                                        303/166
(Continued)

FOREIGN PATENT DOCUMENTS

CN            1683196 A    10/2005
CN          101678775 A     3/2010
(Continued)

OTHER PUBLICATIONS

The Office Action for the corresponding Chinese application No. 201480039181.7, issued on May 18, 2016.
(Continued)

*Primary Examiner* — Tan Q Nguyen
(74) *Attorney, Agent, or Firm* — Global IP Counselors, LLP

(57) ABSTRACT

A state display section of a work vehicle is configured to display whether an electricity storage apparatus is in an electricity charging or discharging state. A state determination unit is configured to determine the state to be displayed on the state display section on the basis of a parameter corresponding to electricity supplied to or discharged from the electricity storage apparatus. The state determination unit is configured to change a threshold for a parameter for determining if the state to be displayed on the state display section is to be set to the charging state (discharging state) based on whether or not the state displayed on the state display section most recently is the charging state (discharging state). Until a predetermined first time period elapses, the state determination section is configured to determine the state after the change as the state to be displayed on the state display section.

16 Claims, 12 Drawing Sheets

(51) Int. Cl.

| | |
|---|---|
| *B60K 6/50* | (2007.10) |
| *B60K 6/445* | (2007.10) |
| *B60L 11/14* | (2006.01) |
| *B60W 20/00* | (2016.01) |
| *E02F 9/20* | (2006.01) |
| *E02F 9/22* | (2006.01) |
| *B60L 1/00* | (2006.01) |
| *B60L 11/00* | (2006.01) |
| *B60L 11/12* | (2006.01) |
| *B60L 11/18* | (2006.01) |
| *B60L 15/20* | (2006.01) |
| *B60K 35/00* | (2006.01) |
| *B60K 6/365* | (2007.10) |
| *B60K 6/387* | (2007.10) |
| *B60K 6/547* | (2007.10) |
| *B60K 6/22* | (2007.10) |
| *B60R 16/02* | (2006.01) |
| *B60W 10/00* | (2006.01) |
| *E02F 3/28* | (2006.01) |
| *B60K 6/38* | (2007.10) |

(52) U.S. Cl.
CPC ............... *B60K 6/445* (2013.01); *B60K 6/50* (2013.01); *B60K 6/547* (2013.01); *B60K 35/00* (2013.01); *B60L 1/003* (2013.01); *B60L 11/005* (2013.01); *B60L 11/123* (2013.01); *B60L 11/14* (2013.01); *B60L 11/1861* (2013.01); *B60L 15/2054* (2013.01); *B60R 16/02* (2013.01); *B60W 10/00* (2013.01); *B60W 20/00* (2013.01); *E02F 3/283* (2013.01); *E02F 9/202* (2013.01); *E02F 9/2075* (2013.01); *E02F 9/2079* (2013.01); *E02F 9/2091* (2013.01); *E02F 9/2292* (2013.01); *E02F 9/2296* (2013.01); *E02F 9/26* (2013.01); *E02F 9/267* (2013.01); *B60K 2006/381* (2013.01); *B60K 2350/1092* (2013.01); *B60L 2200/40* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/545* (2013.01); *B60L 2240/547* (2013.01); *B60L 2240/549* (2013.01); *B60L 2250/16* (2013.01); *B60Y 2200/41* (2013.01); *B60Y 2200/92* (2013.01); *B60Y 2300/182* (2013.01); *B60Y 2400/61* (2013.01); *Y02T 10/6217* (2013.01); *Y02T 10/6239* (2013.01); *Y02T 10/645* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/7241* (2013.01); *Y02T 10/7275* (2013.01); *Y10S 903/904* (2013.01)

(56) References Cited

U.S. PATENT DOCUMENTS

| | | |
|---|---|---|
| 2005/0234627 A1 | 10/2005 | Perach et al. |
| 2010/0090524 A1 | 4/2010 | Obayashi |
| 2010/0106353 A1 | 4/2010 | Watson et al. |
| 2012/0159916 A1* | 6/2012 | Ishii ................. A01D 34/64 56/10.2 A |
| 2014/0303820 A1* | 10/2014 | Aoki ................. B60W 10/08 701/22 |

FOREIGN PATENT DOCUMENTS

| | | |
|---|---|---|
| JP | 5-333121 A | 12/1993 |
| JP | 7-264709 A | 10/1995 |
| JP | 9-107601 A | 4/1997 |
| JP | 2006-329244 A | 12/2006 |
| WO | 2012/081104 A1 | 6/2012 |

OTHER PUBLICATIONS

The International Search Report for the corresponding international application No. PCT/JP2014/069319, issued on Oct. 14, 2014.

* cited by examiner

| MODE | | Lo | | Hi | |
|---|---|---|---|---|---|
| | | L1 | L2 | H1 | H2 |
| MOTOR / GENERATOR | MG1 | M | M | G | G |
| | MG2 | G | G | M | M |
| | MG3 | M | G | M | G |
| CLUTCH | CL | O | O | X | X |
| | CH | X | X | O | O |
| | Cm1 | O | X | X | O |
| | Cm2 | X | O | O | X |

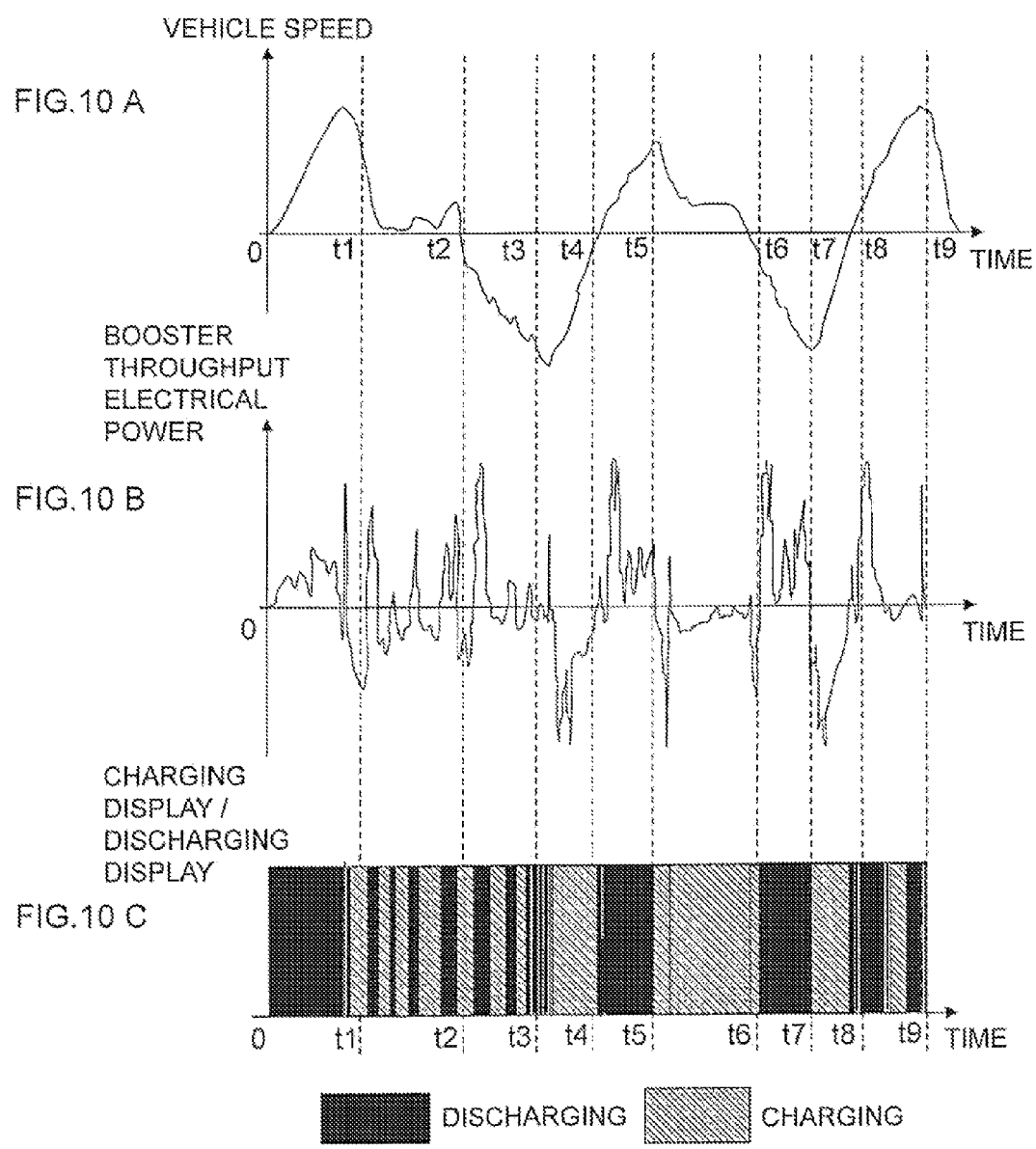

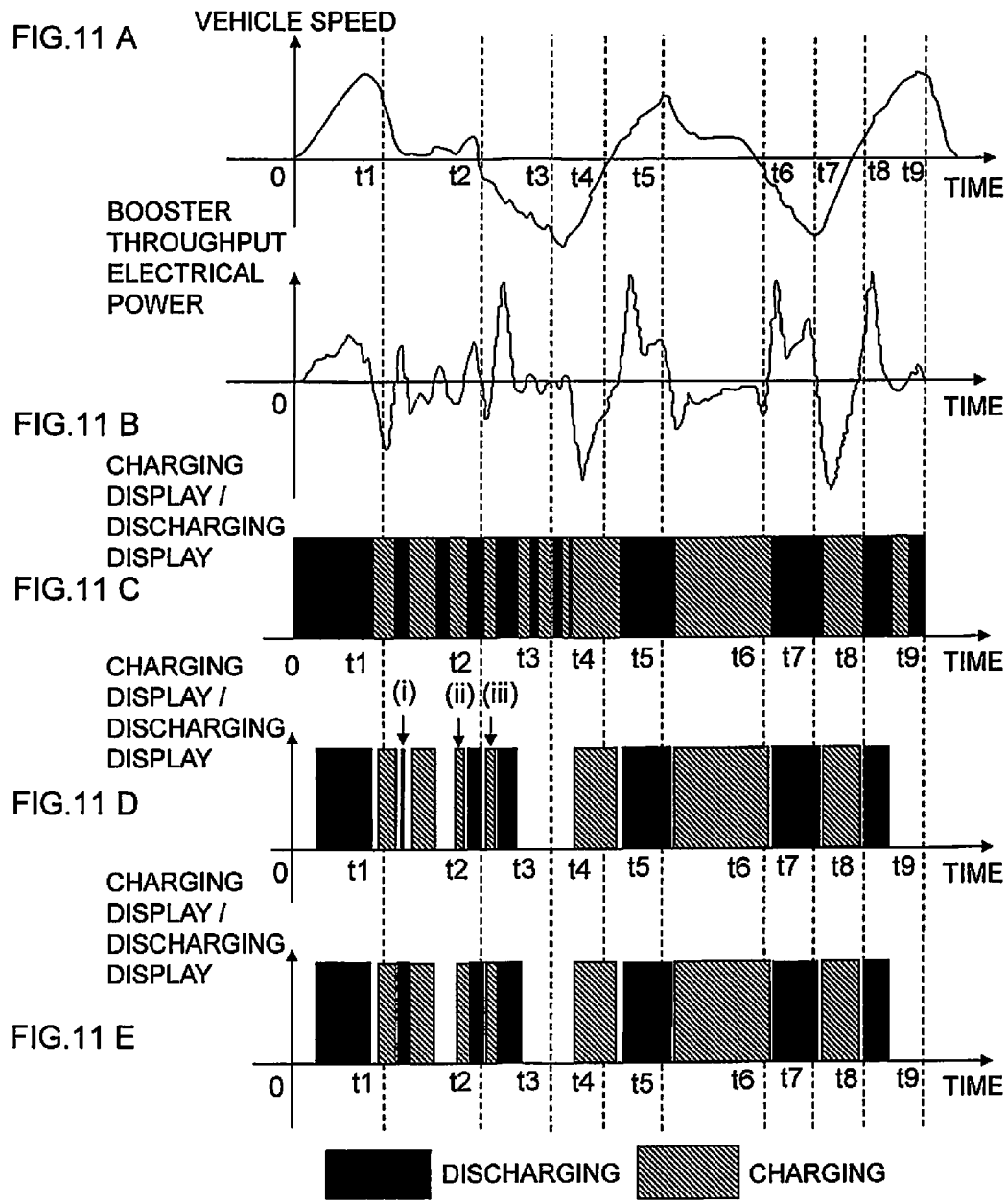

WORK VEHICLE AND WORK VEHICLE CONTROL METHOD

CROSS-REFERENCE TO RELATED APPLICATIONS

This application is a U.S. National stage application of International Application No. PCT/JP2014/069319, filed on Jul. 22, 2014. This U.S. National stage application claims priority under 35 U.S.C. §119(a) to Japanese Patent Application No. 2013-244302, filed in Japan on Nov. 26, 2013, the entire contents of which are hereby incorporated herein by reference.

BACKGROUND

Field of the Invention

The present invention relates to a hybrid work vehicle and a hybrid work vehicle control method.

In recent years, there is proposed a hybrid work vehicle which travels using driving force from an engine and driving force from a motor. As a power transmission apparatus for the hybrid work vehicle, an HMT (hydraulic-mechanical transmission apparatus) and an EMT (electro-mechanical transmission apparatus) are disclosed in, for example, Japanese Laid-Open Patent Application Publication No. 2006-329244.

The HMT has a planetary gear mechanism and two or more hydraulic motors connected to rotation elements of the planetary gear mechanism. The hydraulic motors function as either a motor or a pump according to the travelling conditions of the work vehicle. The HMT is configured to enable stepless changing of the rotation speed of the output shaft by changing the rotation speed of the hydraulic motor.

In the EMT, electric motors are used instead of the hydraulic motors in the HMT. The electric motors function as either a motor or a generator according to the travelling conditions of the work vehicle. The EMT is configured to enable stepless changing of the rotation speed of the output shaft by changing the rotation speed of the electric motor in the same manner as the HMT.

SUMMARY

The EMT type work vehicle requires an electricity storage apparatus that stores electricity generated by the electric motor and supplies the stored electricity. The electricity storage apparatus is, for example, a capacitor or a battery. Except for a parallel hybrid, generally when the electricity storage apparatus runs down, the EMT type vehicle cannot travel. Accordingly, it is important that an operator who drives the EMT type work vehicle can visually confirm an electricity storing state or an electricity discharging state of the electricity storage apparatus.

An object of the present invention is to provide a work vehicle and a work vehicle control method where an operator is able to easily visually confirm an electricity storing state or an electricity discharging state of an electricity storage apparatus.

A work vehicle according to one aspect of the present invention is provided with an engine, a working implement, a travelling apparatus, a power transmission apparatus, an electricity storing apparatus, a state display section, and a state determination unit. The travelling apparatus is driven by the engine. The power transmission apparatus is configured to transfer driving force from the engine to the travelling apparatus. The power transmission apparatus includes an input shaft, an output shaft, and a motor. The electricity storage apparatus is configured to store electricity which is generated by the motor. The state display section is configured to display whether the electricity storage apparatus is in a charging state or a discharging state. The state determination unit is configured to determine the state to be displayed on the state display section on the basis of a parameter which corresponds to electricity which is supplied to the electricity storage apparatus or electricity which is discharged from the electricity storage apparatus. The power transmission apparatus is configured so that the rotation speed ratio of the output shaft with respect to the input shaft is changed by changing of the rotation speed of the motor. The state determination unit is configured to determine whether or not to set the state to be displayed on the state display section to the charging state based on the magnitude relation of a first threshold and the parameter when the state displayed on the state display section most recently is the charging state. The state determination unit is configured to determine whether or not to set the state to be displayed on the state display section to the charging state based on the magnitude relation of a second threshold which is different from the first threshold and the parameter when the state displayed on the state display section most recently is not the charging state. The state determination unit is configured to determine whether or not to set the state to be displayed on the state display section to the discharging state based on the magnitude relation of a third threshold and the parameter when the state displayed on the state display section most recently is the discharging state. The state determination unit is configured to determine to set whether or not to set the state to be displayed on the state display section to the discharging state based on the magnitude relation of a fourth threshold which is different from the third threshold and the parameter when the state displayed on the state display section most recently is not the discharging state. Until a predetermined first time period elapses since the state to be displayed on the state display section changes to the charging state or the discharging state, the state determination unit is configured to determine the state after the change as the state to be displayed on the state display section in a case where the state determination unit cannot determine to set the state to be displayed on the state display section to either of the charging state or the discharging state by using the first to the fourth thresholds.

In a case where the parameter is a positive value when electricity is discharged from the electricity storage apparatus and the parameter is a negative value when electricity is supplied to the electricity storage apparatus, the state determination unit may be configured to determine to set the state to be displayed on the state display section to the charging state in a case where the parameter is smaller than the first threshold when the state displayed on the state display section most recently is the charging state. Furthermore, the state determination unit may be configured to determine to set the state to be displayed on the state display section to the charging state in a case where the parameter is smaller than the second threshold when the state displayed on the state display section most recently is not the charging state. Furthermore, the state determination unit may be configured to determine to set the state to be displayed on the state display section to the discharging state in a case where the parameter is larger than the third threshold when the state displayed on the state display section most recently is the discharging state. Furthermore, the state determination unit may be configured to determine to set the state to be displayed on the state display section to the discharging state in a case where the parameter is larger than the fourth threshold when the state displayed on the state display section most recently is not the discharging state.

In a case where the parameter is a positive value when electricity is supplied to the electricity storage apparatus and the parameter is a negative value when electricity is discharged from the electricity storage apparatus, the state determination unit may be configured to determine to set the state to be displayed on the state display section to the charging state in a case where the parameter is larger than the first threshold when the state displayed on the state display section most recently is the charging state. Furthermore, the state determination unit may be configured to determine to set the state to be displayed on the state display section to the charging state in a case where the parameter is larger than the second threshold when the state displayed on the state display section most recently is not the charging state. Furthermore, the state determination unit may be configured to determine to set the state to be displayed on the state display section to the discharging state in a case where the parameter is smaller than the third threshold when the state displayed on the state display section most recently is the discharging state. Furthermore, the state determination unit may be configured to determine to set the state to be displayed on the state display section to the discharging state in a case where the parameter is smaller than the fourth threshold when the state displayed on the state display section most recently is not the discharging state.

The absolute value of the second threshold may be larger than the absolute value of the first threshold. The absolute value of the fourth threshold may be larger than the absolute value of the third threshold.

The parameter described above be the electrical power charged onto or discharged from the electricity storage unit. Alternatively, the parameter described above may be an average value of electrical power charged onto or discharged from the electricity storage unit, for a predetermined second time period.

The work vehicle may be further provided with a booster. The booster is configured to convert a voltage of the electricity storage apparatus to a predetermined voltage. The parameter described above may be electrical power passing through the booster. Alternatively, the parameter described above may be an average value of electrical power passing through the booster, for a predetermined second time period.

The work vehicle may be further provided with an electricity storage amount display section configured to display the amount of electricity stored in the electricity storage apparatus. The electricity storage amount display section may include at least three elements. The electricity storage amount display section may show the amount of electricity stored in the electricity storage apparatus by means of a number of the elements which are lighted.

A gap between the largest electricity storage amount and the lowest electricity storage amount in the electricity storage apparatus in a state where one of the elements is lighted may be larger than a gap between the largest electricity storage amount and the lowest electricity storage amount in the electricity storage apparatus in a state where any of two or more of the elements are lighted.

The state display section may include a first display element configured to show that the electricity storage apparatus is in the charging state and a second display element configured to show that the electricity storage apparatus is in the discharging state. The first display element may be arranged on a first side of the electricity storage amount display section and the second display element may be arranged on a second side of the electricity storage amount display section.

The state display section may be configured to display in the charging state, an arrow or an arrow head heading toward the electricity storage amount display section. The state display section may be configured to display in the discharging state, an arrow or an arrow head heading toward a direction opposite to the direction that heads toward the electricity storage amount display section.

Each of the first display element and the second display element may include three or more element pieces. The state display section may be configured to display the charging state by moving the lighted element pieces of the first display element in order from the farthest element piece from the electricity storage amount display section toward the closest element piece to the electricity storage amount display section during the charging state. The state display section is configured to display the discharging state by moving the lighted element pieces of the second display element in order from the closest element piece to the electricity storage amount display section toward the farthest element piece from the electricity storage amount display section during the discharging state.

The first display element and the second display element may not be lighted at the same time.

Colors which are displayed by the first display element and the second display element may be different.

A work vehicle control method according to one aspect of the present invention is a method for controlling a work vehicle which is provided with an engine, a working implement, a travelling apparatus, a power transmission apparatus, an electricity storing apparatus, and a state display section. The travelling apparatus is driven using the engine. The power transmission apparatus transfers driving force from the engine to the travelling apparatus. The power transmission apparatus includes an input shaft, an output shaft, and a motor. The electricity storage apparatus stores electricity generated by the motor. The state display section displays whether the electricity storage apparatus is in a charging state or a discharging state. The power transmission apparatus is configured so that a rotation speed ratio of the output shaft with respect to the input shaft is changed by changing of the rotation speed of the motor.

The control method includes a step of determining the state to be displayed on the state display section on the basis of a parameter corresponding to electricity supplied to the electricity storage apparatus or electricity discharged from the electricity storage apparatus. The step of determining the state to be displayed includes the following first to fifth sub-steps. In the first sub-step, whether or not to set the state to be displayed on the state display section to the charging state is determined based on the magnitude relation of a first threshold and the parameter when the state displayed on the state display section most recently is the charging state. In the second sub-step, whether or not to set the state to be displayed on the state display section to the charging state is determined based on the magnitude relation of a second threshold different from the first threshold and the parameter when the state displayed on the state display section most recently is not the charging state. In the third sub-step, whether or not to set the state to be displayed on the state display section to the discharging state is determined based on the magnitude relation of a third threshold and the parameter when the state displayed on the state display section most recently is the discharging state. In the fourth sub-step, whether or not to set the state to be displayed on the state display section to the discharging state is determined based on the magnitude relation of a fourth threshold different from the third threshold and the parameter when the state displayed on the state display section most recently is not the discharging state. In the fifth sub-step, until a predetermined first time period elapses since the state to be displayed on the state display section changes to the charging state or the discharging state, the state after the change is determined as the state to be displayed on the state display section in a case where it is not possible to determine to set the state to be displayed on the state display section to either of the charging state or the discharging state by using the first to the fourth thresholds.

Due to the work vehicle and the work vehicle control method according to the present invention, until a predetermined first time period elapses since the state to be displayed on a state display section changes to a charging state or a discharging state, the state after the change is continuously displayed on the state display section. Accordingly, difficulties in an operator visually confirming the state which is displayed on the state display section due to frequent switching between the charging state and the discharging state are prevented. Furthermore, since a first threshold and a second threshold are different and a third threshold and a fourth threshold are different, frequent switching between the charging state and the discharging state due to fluctuations in the parameter is prevented. Accordingly, it is easy for an operator to visually confirm the state which is displayed on the state display section.

BRIEF DESCRIPTION OF THE DRAWINGS

FIGS. 10A to 10C are diagrams illustrating examples of charging display and discharging display in a case where a state determining process according to the embodiment is not performed.

FIGS. 11A to 11E are diagrams illustrating examples of charging display and discharging display in a case where a state determining process according to the exemplary embodiment is performed.

DESCRIPTION OF EXEMPLARY EMBODIMENTS

Figure 1:
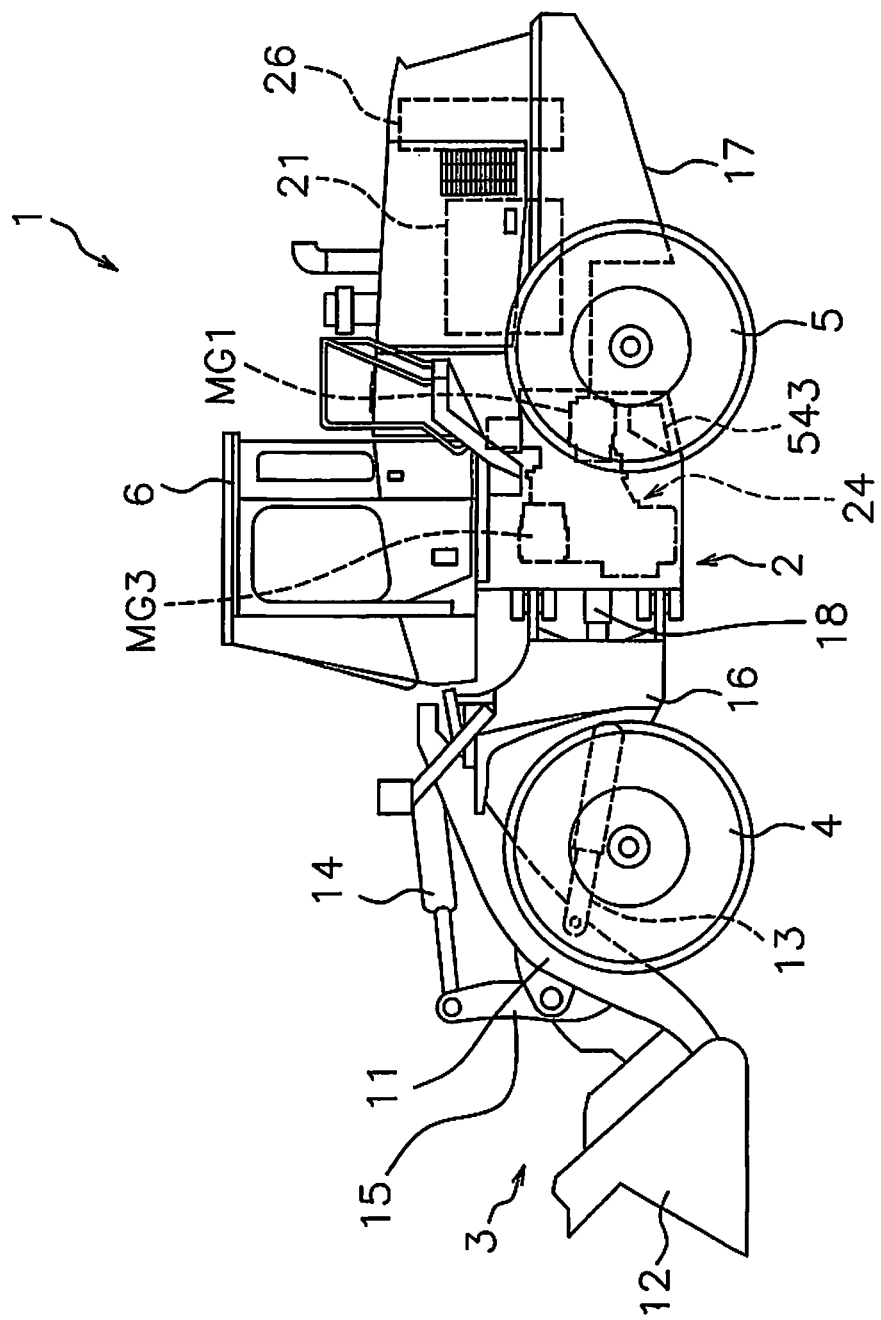
FIG. 1 is a side surface diagram of a work vehicle according to an exemplary embodiment of the present invention.

An exemplary embodiment of the present invention will be described below with reference to the diagrams. FIG. 1 is a side surface diagram of a work vehicle 1 according to an exemplary embodiment of the present invention. The work vehicle 1 is, for example, a wheel loader. The work vehicle 1 is provided with a vehicle frame 2, a working implement 3, travel wheels 4 and 5, and an operator's cab 6 as shown in FIG. 1. The work vehicle 1 travels due to the travel wheels 4 and 5 being driven to rotate. It is possible for the work vehicle 1 to perform work, such as digging, using the working implement 3.

The working implement 3 and the travel wheels 4 and 5 are attached to the vehicle frame 2. The working implement 3 is driven using hydraulic oil from a working implement pump 23 (refer to FIG. 2). The working implement 3 has a boom 11 and a bucket 12. The boom 11 is mounted on the vehicle frame 2. The working implement 3 has a lift cylinder 13 and a bucket cylinder 14. The lift cylinder 13 and the bucket cylinder 14 are hydraulic cylinders. One end of the lift cylinder 13 is attached to the vehicle frame 2. The other end of the lift cylinder 13 is attached to the boom 11. The boom 11 swings up and down by the lift cylinder 13 expanding and contracting due to hydraulic oil from the working implement pump 23. The bucket 12 is attached to the tip end of the boom 11. One end of the bucket cylinder 14 is attached to the vehicle frame 2. The other end of the bucket cylinder 14 is attached to the bucket 12 via a bell crank 15. The bucket 12 swings up and down by the bucket cylinder 14 expanding and contracting due to hydraulic oil from the working implement pump 23.

The operator's cab 6 and the travel wheel 5 are attached to the vehicle frame 2. The operator's cab 6 is placed on the vehicle frame 2. A seat where an operator sits, a monitor which is visually confirmed by an operator, an operating apparatus which will be described later, and the like are arranged inside the operator's cab 6. The vehicle frame 2 has a front frame 16 and a rear frame 17. The front frame 16 and the rear frame 17 are attached to each other to be able to swing in the left and right direction.

The working implement 3 is attached to the front frame 16. The operator's cab 6 is placed on the rear frame 17. In addition, apparatuses, such as an engine 21, a power transmission apparatus 24, and a cooling apparatus 26 which will be described later and the like, are mounted on the rear frame 17. The power transmission apparatus 24 is positioned in front of the engine 21. The cooling apparatus 26 is positioned behind the engine 21. The cooling apparatus 26 has a radiator to cool cooling liquid in the engine 21.

The work vehicle 1 has a steering cylinder 18. The steering cylinder 18 is attached to the front frame 16 and the rear frame 17. The steering cylinder 18 is a hydraulic cylinder. The forward direction of the work vehicle 1 changes to the left and right by the steering cylinder 18 expanding and contracting due to hydraulic oil from a steering pump 30 which will be described later.

Figure 2:
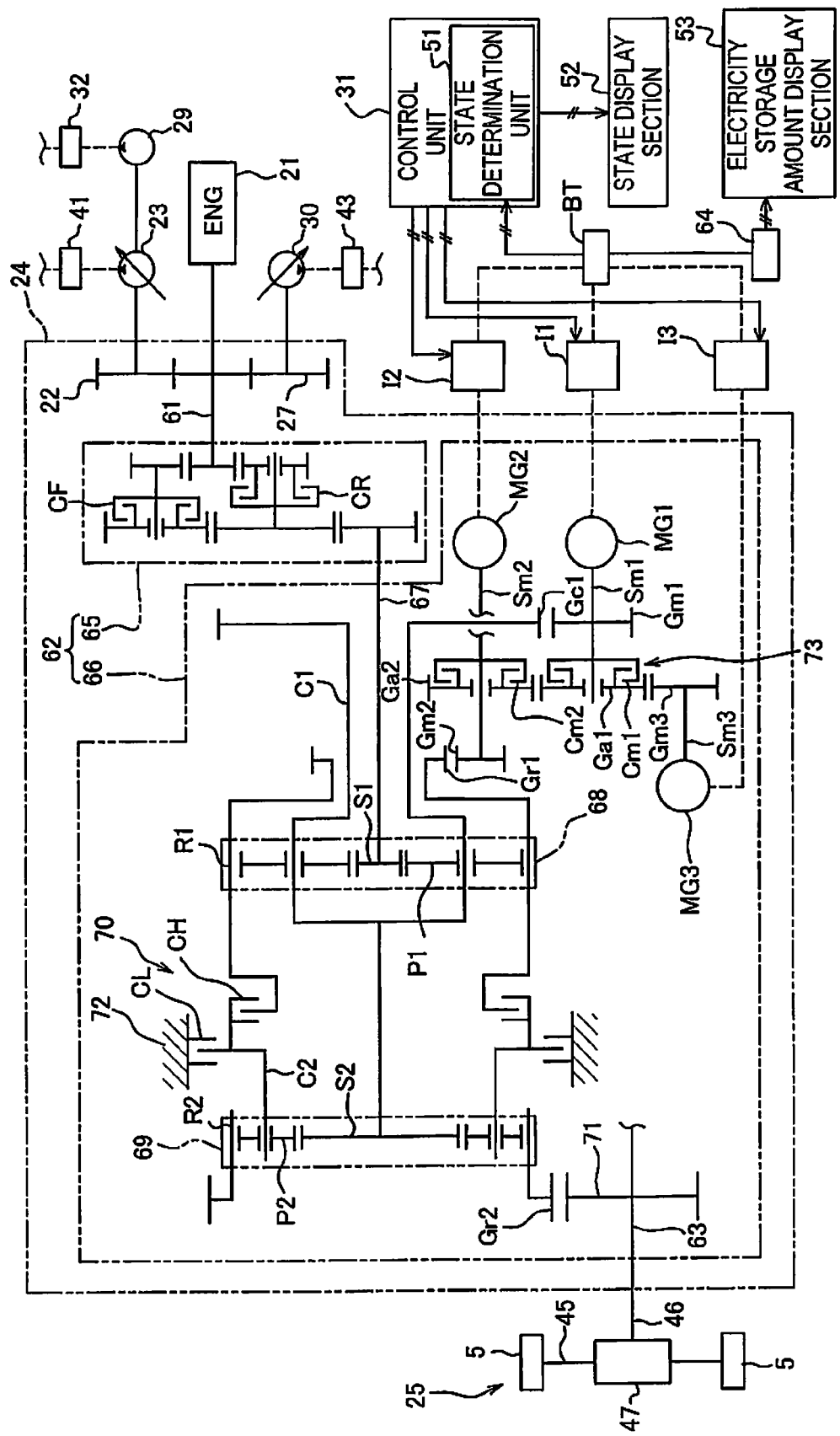
FIG. 2 is a schematic diagram illustrating the configuration of a work vehicle.

FIG. 2 is a schematic diagram illustrating the configuration of the work vehicle 1. The work vehicle 1 is provided with the engine 21, the working implement pump 23, a transmission pump 29, the steering pump 30, the power transmission apparatus 24, a travelling apparatus 25, and the like as shown in FIG. 2.

The engine 21 is, for example, a diesel engine. The engine 21 generates driving force for driving the travelling apparatus 25, the working implement pump 23, the transmission pump 29, the steering pump 30, and the like.

The working implement pump 23, the transmission pump 29, and the steering pump 30 are hydraulic pumps. The working implement pump 23, the transmission pump 29, and the steering pump 30 are driven using driving force from the engine 21.

The working implement pump 23 is a variable capacity type of hydraulic pump. Hydraulic oil which is discharged from the working implement pump 23 is supplied to the lift cylinder 13 and the bucket cylinder 14 described above via a working implement control valve 41.

The transmission pump 29 is a fixed capacity type of hydraulic pump. Hydraulic oil which is discharged from the transmission pump 29 is supplied to various types of clutches in the power transmission apparatus 24 which will be described later via a clutch control valve 32.

The steering pump 30 is a variable capacity type of hydraulic pump. Hydraulic oil which is discharged from the steering pump 30 is supplied to the steering cylinder 18 described above via a steering control valve 43.

The power transmission apparatus 24 transfers driving force from the engine 21 to the travelling apparatus 25. The power transmission apparatus 24 converts and outputs driving force from the engine 21. The configuration of the power transmission apparatus 24 will be described later in detail.

The travelling apparatus 25 is driven using the engine 21. The travelling apparatus 25 has a transfer shaft 46, an axle shaft 45, and the travel wheel 5 described above. The transfer shaft 46 transfers driving force from the power transmission apparatus 24 to the axle shaft 45. The axle shaft 45 extends in a vehicle width direction and is connected with the travel wheel 5. The axle shaft 45 transfers driving force from the power transmission apparatus 24 to the travel wheel 5. Due to this, the travel wheel 5 is rotated.

The configuration of the power transmission apparatus 24 will be described next in detail. The power transmission apparatus 24 is provided with an input shaft 61, a first power takeoff mechanism 22 (referred to below as a "first PTO 22"), a second power takeoff mechanism 27 (referred to below as a "second PTO 27"), a gear mechanism 62, an output shaft 63, a first motor MG1, a second motor MG2, and a third motor MG3.

Rotation from the engine 21 is input to the input shaft 61. The gear mechanism 62 transfers rotation from the input shaft 61 to the output shaft 63. The output shaft 63 is connected with the travelling apparatus 25 described above and transfers rotation from the gear mechanism 62 to the travelling apparatus 25.

The first PTO 22 is connected with the input shaft 61 and transfers a portion of driving force from the engine 21 to the working implement pump 23 and the transmission pump 29. The second PTO 27 is connected with the input shaft 61 in parallel with the first PTO 22 and transfers a portion of driving force from the engine 21 to the steering pump 30.

The gear mechanism 62 is a mechanism which transfers driving force from the engine 21. The gear mechanism 62 is configured so that the rotation speed ratio of the output shaft 63 with respect to the input shaft 61 is changed according to changes in the rotation speed of the motors MG1, MG2, and MG3. The gear mechanism 62 has a FR switching mechanism 65 and a transmission mechanism 66.

The FR switching mechanism 65 has a forward clutch CF, a reverse clutch CR, and various types of gears. The forward clutch CF and the reverse clutch CR are hydraulic clutches. The direction of rotation which is output from the FR switching mechanism 65 is switched due to switching between connection and disconnection of the forward clutch CF and connection and disconnection of the reverse clutch CR.

The transmission mechanism 66 has an intermediate shaft 67, a first planetary gear mechanism 68, a second planetary gear mechanism 69, a Hi/La switching mechanism 70, and an output gear 71. The intermediate shaft 67 is linked with the FR switching mechanism 65. The first planetary gear mechanism 68 and the second planetary gear mechanism 69 are arranged on the same shaft as the intermediate shaft 67.

The first planetary gear mechanism 68 has a first sun gear S1, a plurality of first planetary gears P1, a first carrier C1 which supports the plurality of first planetary gears P1, and a first ring gear R1. The first sun gear S1 is linked with the intermediate shaft 67. The plurality of first planetary gears P1 engage with the first sun gear S1 and are supported by the first carrier C1 to be able to rotate. A first carrier gear Gc1 is provided on an outer circumference section of the first carrier C1. The first ring gear R1 engages with the plurality of planetary gears P1 and is able to rotate. In addition, a first ring outer circumference gear Gr1 is provided on the outer circumference of the first ring gear R1.

The second planetary gear mechanism 69 has a second sun gear S2, a plurality of second planetary gears P2, a second carrier C2 which supports the plurality of second planetary gears P2, and a second ring gear R2. The second sun gear S2 is linked with the first carrier C1. The plurality of second planetary gears P2 engage with the second sun gear S2 and are supported by the second carrier C2 to be able to rotate. The second ring gear R2 engages with the plurality of planetary gears P2 and is able to rotate. A second ring outer circumference gear Gr2 is provided on the outer circumference of the second ring gear R2. The second ring outer circumference gear Gr2 engages with the output gear 71 and rotation from the second ring gear R2 is output to the output shaft 63 via the output gear 71.

The Hi/Lo switching mechanism 70 is a mechanism for switching a driving force transmission path in the power transmission apparatus 24 between a high speed mode (Hi mode) where the vehicle speed is high and a low speed mode (Lo mode) where the vehicle speed is low. The Hi/Lo switching mechanism 70 has a Hi clutch CH which is on during the Hi mode and a Lo clutch CL which is on during the Lo mode. The Hi clutch CH connects or disconnects the first ring gear R1 and the second carrier C2. In addition, the Lo clutch CL connects or disconnects the second carrier C2 and a fixing end 72 and blocks or permits rotation of the second carrier C2.

Here, each of the clutches CH and CL are hydraulic clutches and hydraulic oil from the transmission pump 29 is supplied respectively to each of the clutches CH and CL. Hydraulic oil to each of the clutches CH and CL is controlled using the clutch control valve 32.

The first motor MG1, the second motor MG2, and the third motor MG3 function as drive motors which generate driving force using electrical energy. In addition, the first motor MG1, the second motor MG2, and the third motor MG3 also function as generators which generate electrical energy using driving force which is input.

A first motor gear Gm1 is fixed to a rotation shaft Sm1 in the first motor MG1. The first motor gear Gm 1 engages with the first carrier gear Gc1. A second motor gear Gm2 is fixed to a rotation shaft Sm2 in the second motor MG2. The second motor gear Gm2 engages with the first ring outer circumference gear Gr1.

The third motor MG3 assists the first motor MG1 and the second motor MG2. The transmission mechanism 66 has a motor switching mechanism 73 and the motor switching mechanism 73 switches the target which the third motor MG3 assists selectively between the first motor MG1 and the second motor MG2.

In detail, the motor switching mechanism 73 has a first motor clutch Cm1, a second motor clutch Cm2, a first connecting gear Ga1, and a second connecting gear Ga2. A third motor gear Gm3 is connected with a rotation shaft Sm3 of the third motor MG3 and the third motor gear Gm3 engages with the first connecting gear Ga1. The first motor clutch Cm1 switches between connection and disconnection of the rotation shaft Sm1 of the first motor MG1 and the first connecting gear Ga1. The first connecting gear Ga1 engages with the second connecting gear Ga2. The second motor clutch Cm2 switches between connection and disconnection of the rotation shaft Sm2 of the second motor MG2 and the second connecting gear Ga2.

The first motor clutch Cm1 and the second motor clutch Cm2 are hydraulic clutches. Hydraulic oil from the transmission pump 29 is supplied respectively to each of the motor clutches Cm1 and Cm2. Hydraulic oil to each of the motor clutches Cm1 and Cm2 is controlled using the clutch control valve 32.

The third motor gear Gm3 assists the first motor MG1 in a state where the first motor clutch Cm1 is connected and the second motor clutch Cm2 is disconnected. The third motor gear Gm3 assists the second motor MG2 in a state where the second motor clutch Cm2 is connected and the first motor clutch Cm1 is disconnected.

The first motor MG1 is connected with a capacitor 64 via a first inverter I1. The second motor MG2 is connected to the capacitor 64 via a second inverter I2. The third motor MG3 is connected with the capacitor 64 via a third inverter I3. The first inverter I1, the second inverter I2, and the third inverter I3 respectively drive the first motor MG1, the second motor MG2, and the third motor MG3. The first inverter I1, the second inverter I2, and the third inverter I3 are connected to a booster BT. The booster BT converts the voltage of the capacitor 64 to a predetermined voltage. The predetermined voltage is a voltage which is necessary for the inverters I1, I2, and I3 to drive the motors MG1, MG2, and MG3.

The capacitor 64 functions as an electricity storage apparatus which stores electricity which is generated by the motors MG1, MG2, and MG3. That is, the capacitor 64 stores electrical power which is generated by each of the motors MG1, MG2, and MG3 when the total amount of electrical power generated by each of the motors MG1, MG2, and MG3 is large. In addition, the capacitor 64 discharges power when the total amount of electrical power consumed by each of the motors MG1, MG2, and MG3 is large. Here, a battery may be used as the electricity storage apparatus instead of the capacitor.

Here, expressions which indicate the magnitude of stored electricity are different in the capacitor and the battery. For example, it is typically expressed in voltages in the capacitor, but it is typically expressed in ampere hours (Ah's) in the battery. In the present exemplary embodiment, the magnitude of the electricity stored in the electricity storage apparatus is interpreted as an amount of electricity or an electricity amount, and the amount of electricity or the electricity amount are used as being inclusive of the concept described above. The electricity amount which is stored in the capacitor 64 is displayed using an electricity storage amount display section 53. The electricity storage amount display section 53 is provided in the monitor inside the operator's cab 6. The details of the electricity storage amount display section 53 will be described later.

The work vehicle 1 is provided with a control unit 31. The control unit 31 applies command signals, which express command torque to each of the motors MG1, MG2, and MG3, to the respective inverters I1, I2, and I3. In addition, the control unit 31 applies command signals, which are for controlling the clutch hydraulics for each of the clutches CF, CR, CH, CL, Cm1, and Cm2, to the clutch control valve 32. The clutch control valve 32 includes a plurality of valves for controlling each of the clutches CF, CR, CH, CL, Cm1, and Cm2.

The transmission gear ratio and output torque of the power transmission apparatus 24 is controlled by controlling the motors MG1, MG2, and MG3 and the clutches CF, CR, CH, CL, Cm1, and Cm2 using command signals from the control unit 31. The operations of the power transmission apparatus 24 will be described below.

Figures 3, 4:
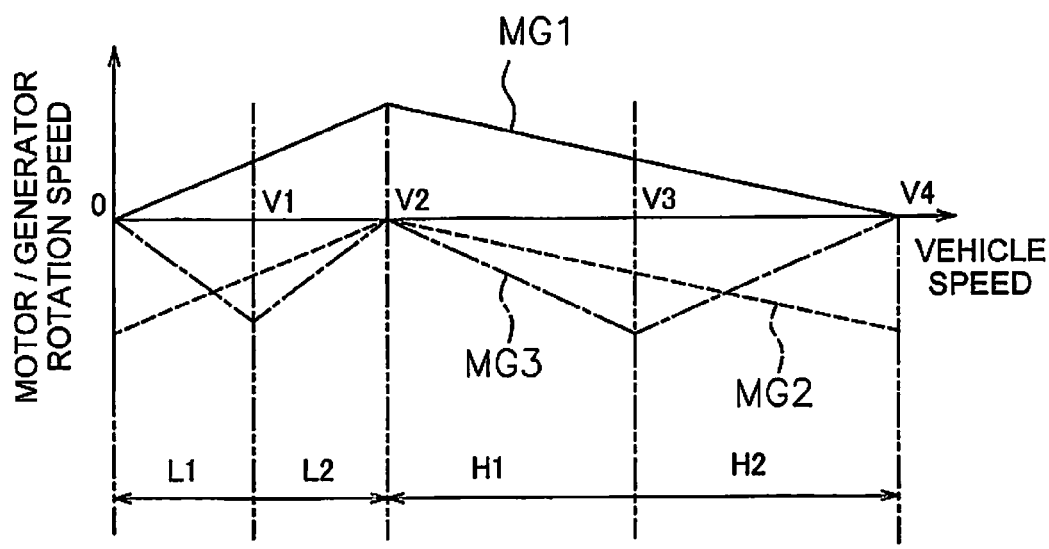
FIG. 3 is a table illustrating functions of first to third motors and the states of each clutch.
FIG. 4 is a diagram illustrating changes in rotation speeds of first to third motors with respect to vehicle speed.

Here, basic operations of the power transmission apparatus 24 will be described using FIG. 3 and FIG. 4 in a case where the vehicle speed is accelerating forward from zero while the rotation speed of the engine 21 is maintained to be constant. FIG. 3 shows functions of the motors MG1, MG2, and MG3 and the states of the clutches in each mode. The Lo mode has an L1 mode and an L2 mode. The Hi mode has an H1 mode and an H2 mode. In FIG. 3, "M" has the meaning of the motors MG1, MG2, and MG3 functioning as a drive motor. "G" has the meaning of the motors MG1, MG2, and MG3 functioning as a generator. "O" has the meaning of the clutch being in a state of connection. "X" has the meaning of the clutch being in a state of disconnection.

FIG. 4 shows the rotation speeds of each of the motors MG1, MG2, and MG3 with respect to vehicle speed. In a case where the rotation speed of the engine 21 is constant, the vehicle speed changes according to the rotation speed ratio of the power transmission apparatus 24. The rotation speed ratio is the ratio of the rotation speed of the output shaft 63 with respect to the rotation speed of the input shaft 61. Accordingly, changes in vehicle speed in FIG. 4 coincide with changes in the rotation speed ratio of the power transmission apparatus 24. That is, FIG. 4 shows the relationship between the rotation speeds of each of the motors MG1, MG2, and MG3 and the rotation speed ratio of the power transmission apparatus 24. In FIG. 4, the solid line indicates the rotation speed of the first motor MG1, the dashed line indicates the rotation speed of the second motor MG2, and the one-dot chain line indicates the rotation speed of the third motor MG3.

Over the range where the vehicle speed is equal to or more than zero and less than V1, the Lo clutch CL is connected, the Hi clutch CH is disconnected, the first motor clutch Cm1 is connected, and the second motor clutch Cm2 is disconnected (L1 mode). Since the Hi clutch CH is disconnected, the second carrier C2 and the first ring gear R1 are disconnected. Since the Lo clutch CL is connected, the second carrier C2 is fixed. In addition, the first connecting gear Ga1 is connected with the rotation shaft Sm 1 of the first motor MG1 and the second connecting gear Ga2 is disconnected from the rotation shaft Sm2 of the second motor MG2. Due to this, the third motor MG3 is connected with the first motor MG1 via the third motor gear Gm3, the first connecting gear Ga1, and the first motor clutch Cm1. In addition, since the second motor clutch Cm2 is disconnected, the third motor MG3 is disconnected from the second motor MG2.

In the L1 mode, the driving force from the engine 21 is input into the first sun gear S1 via the intermediate shaft 67 and this driving force is output from the first carrier C1 to the second sun gear S2. On the other hand, the driving force which is input into the first sun gear S1 is transferred from the first planetary gears P1 to the first ring gear R1 and is output to the second motor MG2 via the first ring outer circumference gear Gr1 and the second motor gear Gm2. In the L1 mode, the second motor MG2 mainly functions as a generator and a portion of the electrical power which is generated by the second motor MG2 is stored in the capacitor 64.

In addition, the first motor MG1 and the third motor MG3 mainly function as electric motors in the LI mode. The driving force from the first motor MG1 and the third motor MG3 is output to the second sun gear S2 using a pathway of the first motor gear Gm1→the first carrier gear Gc1→the first carrier C1. The driving force which is output to the second sun gear S2 in the manner described above is transferred to the output shaft 63 using a pathway of the second planetary gears P2 -4 the second ring gear R2→the second ring outer circumference gear Gr2→the output gear 71.

Over the range where the vehicle speed is equal to or more than V1 and less than V2, the Lo clutch CL is connected, the Hi clutch CH is disconnected, the first motor clutch Cm1 is disconnected, and the second motor clutch Cm2 is connected (L2 mode). Accordingly, the second connecting gear Ga2 is connected with the rotation shaft Sm2 of the second motor MG2 and the first connecting gear Ga1 is disconnected from the rotation shaft Sm1 of the first motor MG1. Due to this, the third motor MG3 is connected with the second motor MG2 via the third motor gear Gm3, the first connecting gear Ga1, the second connecting gear Ga2, and the second motor clutch Cm2. In addition, since the first motor clutch Cm1 is disconnected, the third motor MG3 is disconnected from the first motor MG1.

In the L2 mode, the driving force from the engine 21 is input into the first sun gear S1 via the intermediate shaft 67 and this driving force is output from the first carrier C1 to the second sun gear S2. On the other hand, the driving force which is input into the first sun gear S1 is transferred from the first planetary gears P1 to the first ring gear R1 and is output to the second motor MG2 via the first ring outer circumference gear Gr1 and the second motor gear Gm2. In addition, driving force is output from the second motor gear Gm2 to the third motor MG3 via the second motor clutch Cm2, the second connecting gear Ga2, the first connecting gear Ga1, and the third motor gear Gm3. In the L2 mode, the second motor MG2 and the third motor MG3 mainly function as generators and a portion of the electrical power which is generated by the second motor MG2 and the third motor MG3 is stored in the capacitor 64.

In addition, the first motor MG1 mainly functions as an electric motor in the L2 mode. The driving force from the first motor MG1 is output to the second sun gear S2 using a pathway of the first motor gear Gm1→the first carrier gear Gc1→the first carrier C1. The driving force which is output to the second sun gear S2 in the manner described above is transferred to the output shaft 63 using a pathway of the second planetary gears P2→the second ring gear R2→the second ring outer circumference gear Gr2→the output gear 71.

Over the range where the vehicle speed is equal to or more than V2 and less than V3, the Lo clutch CL is disconnected, the Hi clutch CH is connected, the first motor clutch Cm1 is disconnected, and the second motor clutch Cm2 is connected (H1 mode). Since the Hi clutch CH is connected in the H1 mode, the second carrier C2 and the first ring gear R1 are connected. In addition, since the Lo clutch CL is disconnected, the second carrier C2 is released. Accordingly, the rotation speeds of the first ring gear R1 and the second carrier C2 coincide. In addition, the second connecting gear Ga2 is connected with the rotation shaft Sm2 of the second motor MG2 and the first connecting gear Ga1 is disconnected from the rotation shaft Sm1 of the first motor MG1. Due to this, the third motor MG3 is connected with the second motor MG2 via the third motor gear Gm3, the first connecting gear Ga1, the second connecting gear Ga2, and the second motor clutch Cm2. In addition, since the first motor clutch Cm1 is disconnected, the third motor MG3 is disconnected from the first motor MG1.

In the H1 mode, the driving force from the engine 21 is input into the first sun gear S1 and this driving force is output from the first carrier C1 to the second sun gear S2. In addition, the driving force which is input into the first sun gear S1 is output from the first carrier C1 to the first motor MG1 via the first carrier gear Gc1 and the first motor gear Gm1. In the H1 mode, since the first motor MG1 mainly functions as a generator, a portion of the electrical power which is generated by the first motor MG1 is stored in the capacitor 64.

In addition, the second motor MG2 and the third motor MG3 mainly function as electric motors in the H1 mode. The driving force from the third motor MG3 is transferred from the third motor gear Gm3 to the rotation shaft Sm2 of the second motor MG2 via the first connecting gear Ga1, the second connecting gear Ga2, and the second motor clutch Cm2. Then, the driving force from the second motor MG2 and the driving force from the third motor MG3 is output to the second carrier C2 using a pathway of the second motor gear Gm2→the first ring outer circumference gear On→the first ring gear R1→the Hi clutch CH. The driving force which is output to the second sun gear S2 in the manner described above is output to the second ring gear R2 via the second planetary gears P2 and the driving force which is output to the second carrier C2 is output to the second ring gear R2 via the second planetary gears P2. The driving force which is combined using the second ring gear R2 in this manner is transferred to the output shaft 63 via the second ring outer circumference gear Gr2 and the output gear 71.

Over the range where the vehicle speed is equal to or more than V3 and less than V4, the Lo clutch CL is disconnected, the Hi clutch CH is connected, the first motor clutch Cm1 is connected, and the second motor clutch Cm2 is disconnected (H2 mode). In the H2 mode, the first connecting gear Ga1 is connected with the rotation shaft Sm1 of the first motor MG1 and the second connecting gear Ga2 is disconnected from the rotation shaft Sm2 of the second motor MG2. Due to this, the third motor MG3 is connected with the first motor MG1 via the third motor gear Gm3, the first connecting gear Ga1, and the first motor clutch Cm1. In addition, since the second motor clutch Cm2 is disconnected, the third motor MG3 is disconnected from the second motor MG2.

In the H2 mode, the driving force from the engine 21 is input into the first sun gear S1 and this driving force is output from the first carrier C1 to the second sun gear S2. In addition, the driving force which is input into the first sun gear S1 is output from the first carrier C1 to the first motor MG1 and the third motor MG3 via the first carrier gear Gc1 and the first motor gear Gm1. In the H2 mode, since the first motor MG1 and the third motor MG3 mainly function as generators, a portion of the electrical power which is generated by the first motor MG1 and the third motor MG3 is stored in the capacitor 64.

In addition, the second motor MG2 mainly functions as an electric motor in the H2 mode. The driving force from the second motor MG2 is output to the second carrier C2 using a pathway of the second motor gear Gm2→the first ring outer circumference gear Gr1→the first ring gear R1→the Hi clutch CH. The driving force which is output to the second sun gear S2 in the manner described above is output to the second ring gear R2 via the second planetary gears P2 and the driving force which is output to the second carrier C2 is output to the second ring gear R2 via the second planetary gears P2. The driving force which is combined using the second ring gear R2 in this manner is transferred to the output shaft 63 via the second ring outer circumference gear Gr2 and the output gear 71.

Here, the above is a description of when driving forward but the operations are the same when driving in reverse.

The control unit 31 includes a state determination unit 51. The state determination unit 51 determines the state to be displayed on a state display section 52 on the basis of a parameter which corresponds to electricity which is supplied to the capacitor 64 or electricity which is discharged from the capacitor 64. The state display section 52 displays whether the capacitor 64 is in the charging state or the discharging state. The state display section 52 is provided in a monitor which is inside the operator's cab 6. The details of the state display section 52 will be described later.

The state determination unit 51 uses electrical power which passes through the booster BT or the average value of electrical power which passes through the booster BT for a predetermined time period $\Delta t1$ as the parameter which is described above. In other words, the state determination unit 51 uses electrical power which is charged to or discharged from the capacitor 64 or the average value of electrical power which is charged to or discharged from the capacitor 64 for the predetermined time period $\Delta t1$ as the parameter which is described above. The method for determining the state using the state determination unit 51 will be described later.

Figure 5:
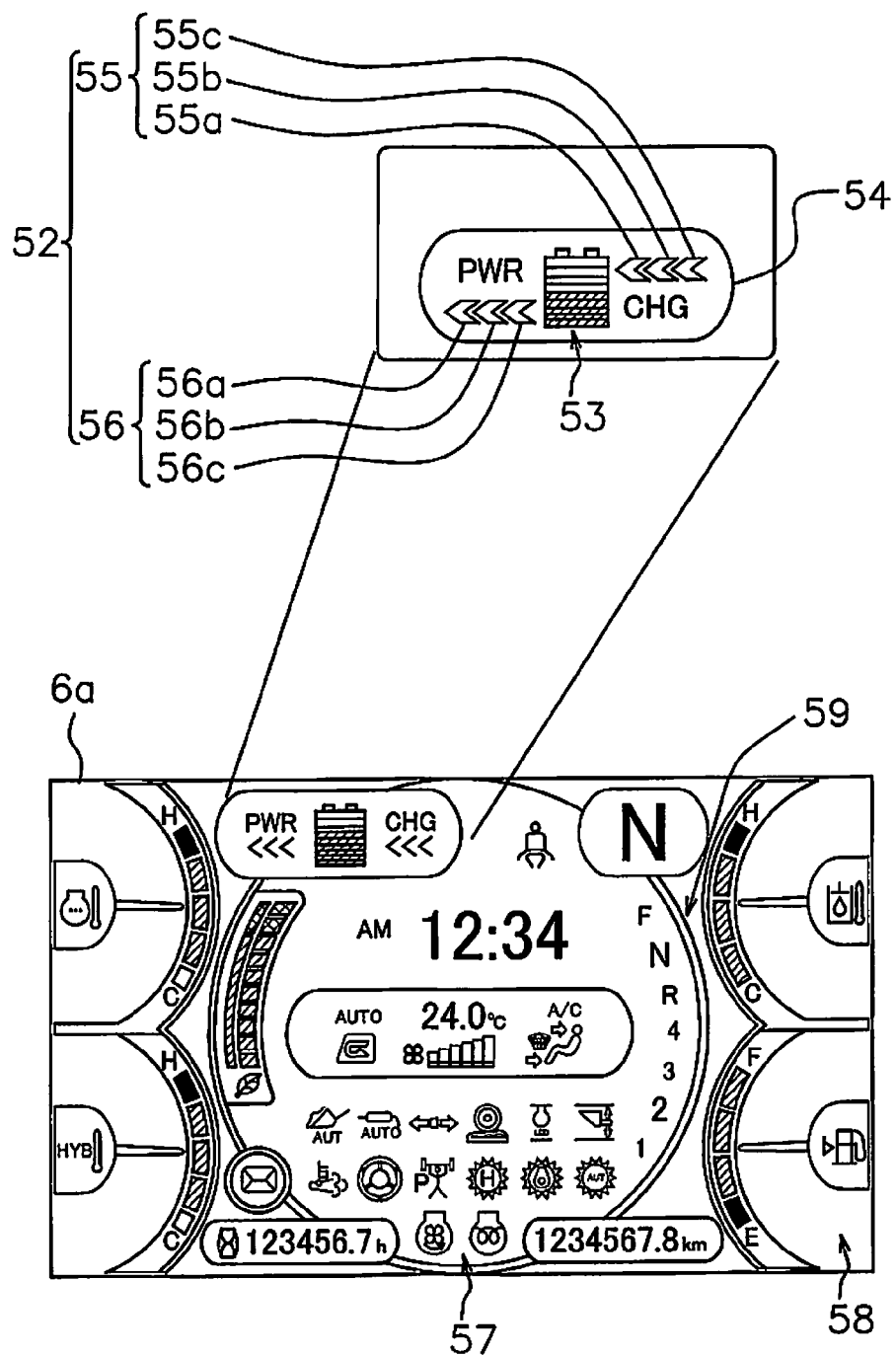
FIG. 5 is a diagram showing a portion of a monitor in an operator's cab.

Details on the state display section 52 and the electricity storage amount display section 53 will be described next. FIG. 5 is a diagram showing a portion of a monitor 6a in the operator's cab 6. An enlarged diagram of the state display section 52 and the electricity storage amount display section 53 is also shown in FIG. 5. The monitor 6a is arranged in front of the seat in an inner section of the operator's cab 6. The monitor 6a displays various types of pilot lights which are lighted during operations of devices such as the parking brake, a fuel gauge 58, a shift indicator 59 which shows the speed reduction ratio which is selected, and the like as shown in FIG. 5.

The state display section 52 and the electricity storage amount display section 53 are displayed in the vicinity of the central upper portion of the monitor 6a. The state display section 52 is arranged in the vicinity of the electricity storage amount display section 53. In the description from here onwards, a display portion where the state display section 52 and the electricity storage amount display section 53 are combined is referred to as a capacitor display unit 54.

The state display section 52 includes a first display element 55 and a second display element 56. The first display element 55 shows that the capacitor 64 is in the charging state. The second display element 56 shows that the capacitor 64 is in the discharging state. Each of the first display element 55 and the second display element 56 include three or more element pieces. The element pieces of the first display element 55 are shown in FIG. 5 in order from the left as 55a, 55b, and 55c, respectively. In addition, the element pieces of the second display element 56 are shown in order from the left as 56a, 56b, and 56c, respectively. The element piece 55c is the element piece that is the farthest from the electricity storage amount display section 53 among the element pieces of the first display element 55. The element piece 55a is the element piece that is the closest to the electricity storage amount display section 53 among the element pieces of the first display element 55. The element piece 55b is the element piece that is positioned in between the element piece 55a and the element piece 55c. The element piece 56a is the element piece that is the farthest from the electricity storage amount display section 53 among the element pieces of the second display element 56. The element 56c piece is the element piece that is the closest to the electricity storage amount display section 53 among the element pieces of the second display element 56. The element piece 56b is the element piece that is positioned in between the element piece 56a and the element piece 56c.

The first display element 55 is arranged on a first side of the electricity storage amount display section 53 and the second display element 56 is arranged on a second side of the electricity storage amount display section 53. An example is shown in FIG. 5 where the first display element 55 is arranged on the right side of the electricity storage amount display section 53 and the second display element 56 is arranged on the left side of the electricity storage amount display section 53. However, the positional relationship of the first display element 55 and the second display element 56 with respect to the electricity storage amount display section 53 is not limited to the example in FIG. 5. For example, the first display element 55 may be arranged on the left side of the electricity storage amount display section 53 and the second display element 56 may be arranged on the right side of the electricity storage amount display section 53. Alternatively, the first display element 55 may be arranged on the upper side of the electricity storage amount display section 53 and the second display element 56 may be arranged on the lower side of the electricity storage amount display section 53. Furthermore, the first display element 55 and the second display element 56 need not be arranged in positions which are symmetrical with respect to the electricity storage amount display section 53. For example, the first display element 55 may be arranged on the upper side of the electricity storage amount display section 53 and the second display element 56 may be arranged on the left side of the electricity storage amount display section 53. That is, it is sufficient if the relative position of the first display element 55 with respect to the electricity storage amount display section 53 is different from the relative position of the second display element 56 with respect to the electricity storage amount display section 53.

Each of the display element pieces 55a, 55b, and 55c of the first display element 55 has a shape of an arrow head which heads toward the electricity storage amount display section 53. Each of the display element pieces 56a, 56b, and 56c in the second display element 56 has a shape of an arrow head which heads toward a direction opposite to the direction which heads toward the electricity storage amount display section 53. Here, the shape of each of the element pieces 55a, 55b, 55c, 56a, 56b, and 56c may be other shapes which indicate a direction (for example, an arrow or the like). In the example in FIG. 5, each of the element pieces 55a, 55b, 55c, 56a, 56b, and 56c has a shape which is an arrow head which heads toward a leftward direction since the first display element 55 is arranged on the right side of the electricity storage amount display section 53 and the second display element 56 is arranged on the left side of the electricity storage amount display section 53.

Figure 6:
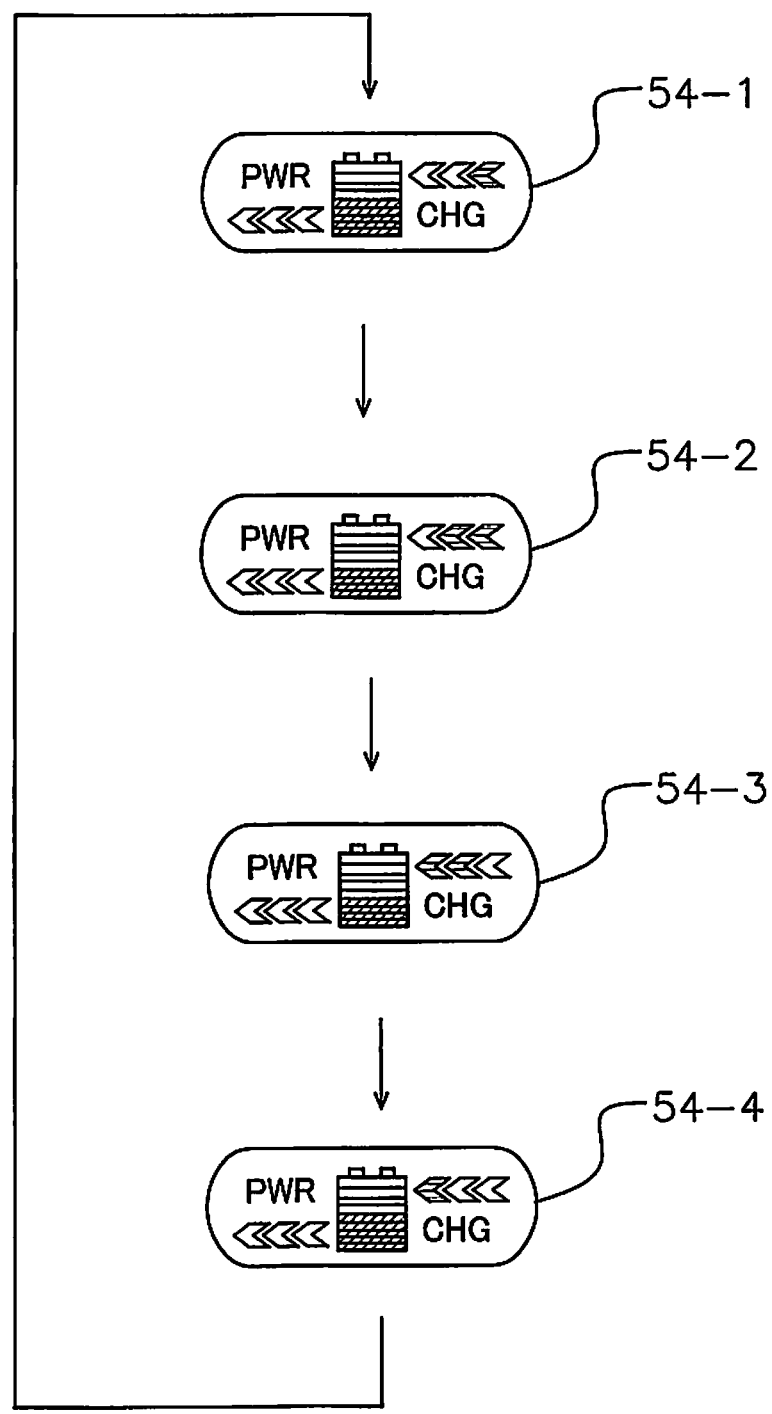
FIG. 6 is a diagram showing a method for displaying the charging method using a first display element.
Figure 7:
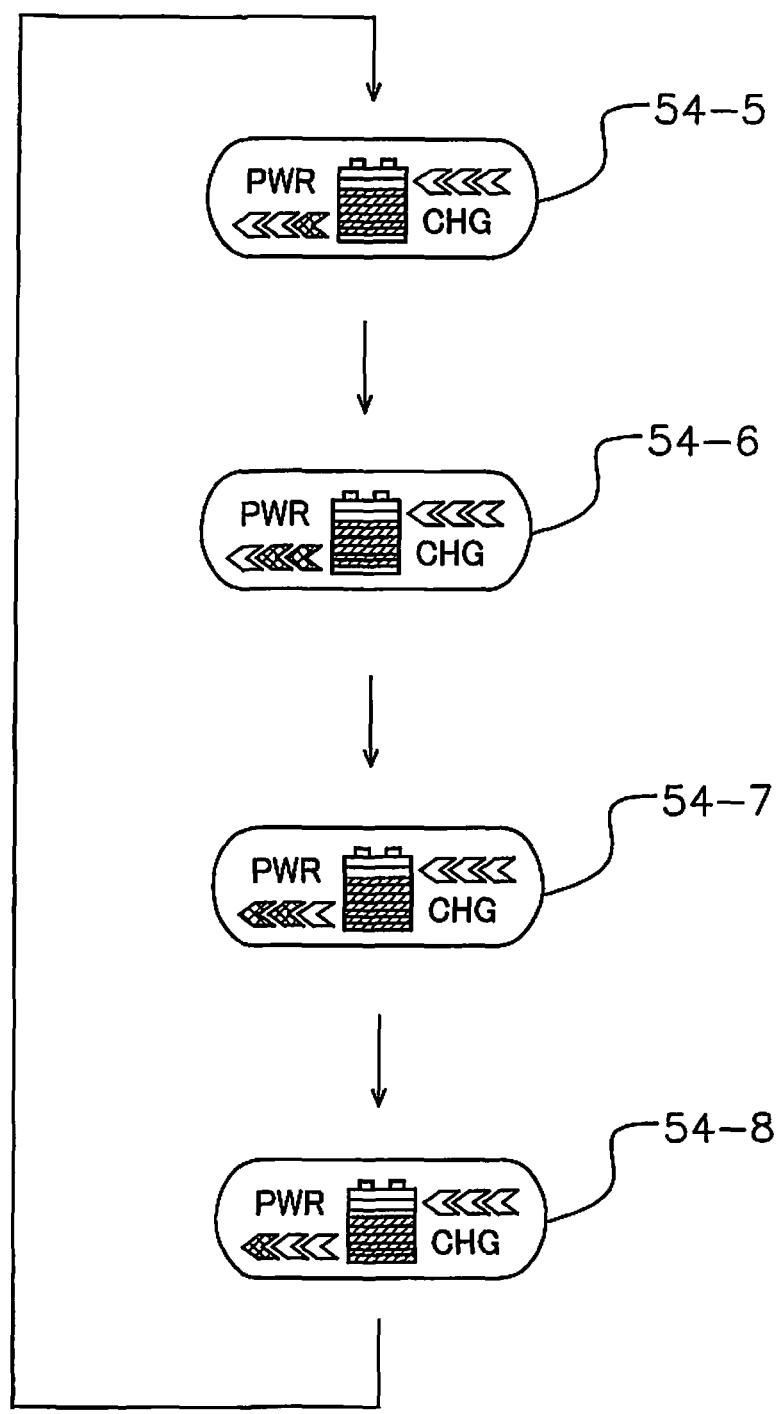
FIG. 7 is a diagram showing a method for displaying a discharging method using a second display element.

The method for displaying the charging state using the first display element 55 and the method for displaying the discharging state using the second display element 56 will be described next. FIG. 6 is a diagram showing a method for displaying the charging method using the first display element 55. FIG. 7 is a diagram showing a method for displaying the discharging method using the second display element 56. Display examples 54-1 to 54-4 of the capacitor display unit 54 which is illustrated in FIG. 6 are displayed in order of 54-1→54-2→54-3→54-4→54-1 (the same applies below). Display examples 54-5 to 54-8 of the capacitor display unit 54 which is illustrated in FIG. 7 are displayed in order of 54-5→54-6→54-7→54-8→54-5 (the same applies below). The elements which are lighted are displayed in FIG. 6 and FIG. 7 using hatching. According to FIG. 6, the state display section 52 displays the charging state by moving the lighted element pieces of the first display element 55 in order from the element piece 55c which is farthest from the electricity storage amount display section 53 toward the element piece 55a which is closest to the electricity storage amount display section 53 in a case where the capacitor 64 is in the charging state. According to FIG. 7, the state display section 52 displays the discharging state by moving the lighted element pieces of the second display element 56 in order from the element piece 56c which is closest to the electricity storage amount display section 53 toward the element piece 56a which is farthest from the electricity storage amount display section 53 in a case where the capacitor 64 is in the discharging state. Although described more in detail later, the first display element 55 and the second display element 56 are not lighted at the same time since the state determination unit 51 does not determine between the charging state or the discharging state. Here, only the intermediate element piece 55b may be lighted instead of the change of 54-2→54-3 in FIG. 6. In the same manner, only the intermediate element piece 56b may be lighted instead of the change of 54-6→54-7 in FIG. 7.

Furthermore, according to FIG. 6, the state display section 52 displays the arrow head which heads toward the electricity storage amount display section 53 in a case where the capacitor 64 is in the charging state. According to FIG. 6, the state display section 52 displays the arrow head which heads toward the direction which is the opposite to the direction which heads toward the electricity storage amount display section 53 in a case where the capacitor 64 is in the discharging state. Here, there may be arrows instead of the arrow heads described above in a case where the shape of each of the element pieces 55a, 55b, 55c, 56a, 56b, and 56c is an arrow.

The color which is displayed by the first display element 55 and the color which is displayed by the second display element 56 are different. For this reason, there is hatching which differs for the elements which are lighted in FIG. 6 and FIG. 7.

The details of the storage electricity amount display section 53 will be described next. The storage electricity amount display section 53 includes at least three bar elements as shown in FIG. 5. The storage electricity amount display section 53 shows the amount of electricity stored in the capacitor 64 by means of a number of the bar elements which are lighted. One example of the amount of electricity which corresponds to the number of the bar elements which are lighted is shown in Table I below.

TABLE 1

| Capacitor Voltage | Number of Lighted Bar Elements |
|---|---|
| Less than V(0) | 0 |
| Equal or more than V(0) and less than (V1) | 1 |
| Equal or more than V(1) and less than (V2) | 2 |
| Equal or more than V(2) and less than (V3) | 3 |
| Equal or more than V(3) and less than (V4) | 4 |
| Equal or more than V(4) and less than (V5) | 5 |
| Equal or more than V(5) and less than (V6) | 6 |
| Equal or more than V(6) and less than (V7) | 7 |
| Equal or more than V(7) | 8 |

Here, when $\Delta V(i)=V(i)-V(i-1)$ (where i is an integer), $\Delta V(1)$ is larger than V(2) to V(7). That is, a gap between the largest electricity storage amount and the lowest electricity storage amount in the capacitor 64 in a state where one of the bar elements is lighted is larger than a gap between the largest electricity storage amount and the lowest electricity storage amount in the capacitor 64 in a state where any of two or more of the bar elements are lighted. Here, the values of V(2) to V(7) is set to be smaller values since the voltages from V(2) to V(7) are voltages which are normally used in the capacitor 64.

Figure 8A:
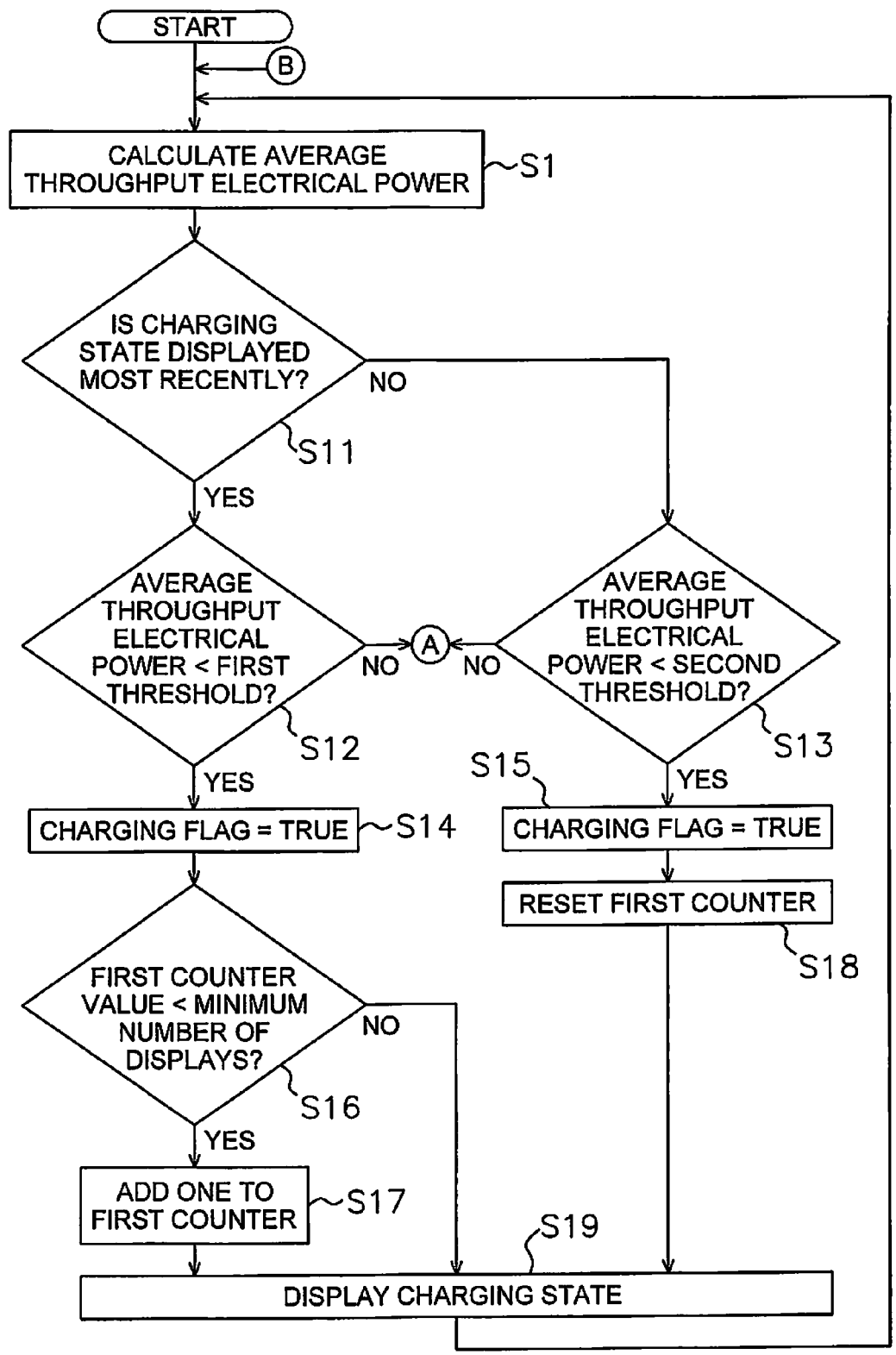
FIG. 8A is a flow chart illustrating a flow of processes where a state determination unit determines a charging state.
Figure 8B:
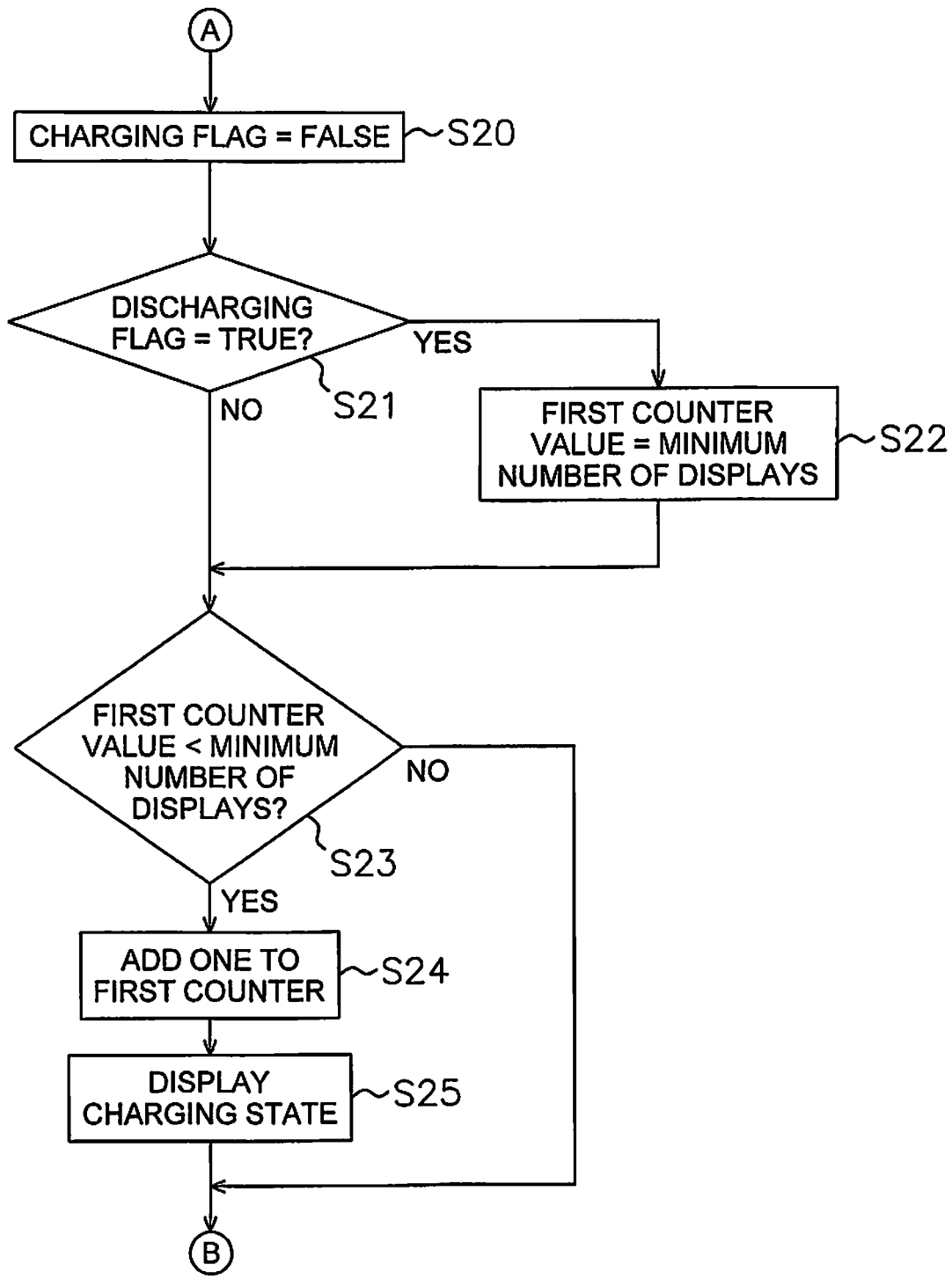
FIG. 8B is a flow chart illustrating a flow of processes where a state determination unit determines a charging state.

A specific method for determination using the state determination unit 51 will be described next. FIG. 8A and FIG. 8B are flow charts illustrating a flow of processes where the state determination unit 51 determines the charging state. First, in step S1, the state determination unit 51 calculates the average value for the electrical power which passes through the booster BT. The average value which is calculated is referred to as average throughput electrical power. Here, the electrical power which passes through the booster BT is positive for electrical power which is output from the capacitor 64 to the inverters I1, I2, and I3 and is negative for electrical power which is output from the inverters I1, I2, and I3 to the capacitor 64. That is, when the electrical power is negative, this has the meaning that charging of the capacitor 64 is being carried out, and when the electrical power is positive, this has the meaning that discharging from the capacitor 64 is being carried out. The state determination unit 51 acquires the electrical power which passes through the booster BT for each predetermined sampling time period and calculates the average value for the predetermined time period $\Delta t1$ as the average throughput electrical power.

Next, in step S11, the state determination unit 51 determines whether or not the state display section 52 most recently displays "charging state". In a case where "charging state" is displayed most recently (Yes in step S11), the state determination unit 51 determines whether or not the average throughput electrical power is less than a first threshold (step S12). In a case where "charging state" is not displayed most recently (No in step S11), the state determination unit 51 determines whether or not the average throughput electrical power is less than a second threshold (step S13). Here, the second threshold is smaller than the first threshold and the first threshold and the second threshold are both negative values. That is, the absolute value of the second threshold is larger than the absolute threshold of the first threshold. The first threshold and the second threshold are values which are set in advance and are stored using the control unit 31.

In a case where the average throughput electrical power is less than the first threshold or the second threshold (Yes in step S12 or Yes in step S13), a charging flag is set to True (step S14 or step S15). In a case where the average throughput electrical power is equal to or more than the first threshold or the second threshold (No in step S12 or No in step S13), the charging flag is set to False (step S20). Here, a charging flag has values of either True or False in a Boolean flag which is utilized by the state determination unit 51 to determine the "charging state" or the "discharging state".

When step S14 is finished, the state determination unit 51 determines whether or not a first counter value is less than the minimum number of displays in step S16. Here, the first counter is a counter for measuring the time period over which "charging state" is displayed on the state display section 52. It is possible to calculate the time period over which "charging state" is displayed if the counter value is multiplied by a time period interval $\Delta ts$ which is executed in step S1. The minimum number of displays is a counter value that indicates a minimum time period $\Delta t2$ over which "charging state" is continuously displayed and which is a value which is set in advance and stored using the control unit 31. Accordingly, when the first counter value is less than the minimum number of displays (Yes in step S16), this has the meaning that the minimum time period over which "charging state" is continuously displayed has not been reached. At this time, one is added to the first counter value in step S17. In other words, the first counter is incremented by one. Then, in step S19, the state determination unit 51 determines that the state to be displayed on the state display section 52 is "charging state" and displays "charging state" on the state display section 52. When the first counter value is equal to or more than the minimum number of displays (No in step S16), the state determination unit 51 determines that the state to be displayed on the state display section 52 is "charging state" and displays "charging state" on the state display unit 52 without modifying the first counter value without modifying the first counter value (step S19).

When step S15 is finished, the state determination unit 51 resets the first counter in step S18. That is, the state determination unit 51 sets the counter value of the first counter to zero. After this, the state determination unit 51 determines that the state to be displayed on the state display section 52 is "charging state" and displays "charging state" on the state display section 52 (step S19). After step S19 is finished, the flow returns to step S1.

When step S20 is finished, the state determination unit 51 determines whether or not the discharging flag is True in step S21. The discharging flag has values of either True or False in a Boolean flag which is utilized by the state determination unit 51 in order to determine the "charging state" or the "discharging state". The method for setting the value for the discharging flag will be described later. When the discharging flag is True (Yes in step S21), the state determination unit 51 sets the minimum number of displays as the counter value of the first counter (step S22). That is, due to steps S23 to S25 which will be described later, "charging state" is not displayed on the state display section 52. When the discharging flag is False (No in step S21) or step S22 is finished, the state determination unit 51 determines whether or not the first counter value is less than the minimum number of displays in step S23. When the first counter value is less than the minimum number of displays (Yes in step S23), one is added to the first counter in step S24. In other words, the first counter is incremented by one. After this, the state determination unit 51 determines that the state to be displayed on the state display section 52 is "charging state" and displays "charging state" on the state display section 52 (step S25). Due to steps S23 to S25, the state determination unit 51 determines that the charging state (that is, the state after the change) is the state to be displayed on the state display section 52 until the predetermined time period $\Delta t2$ elapses since the state to be displayed on the state display section 52 changes to the charging state while the discharging flag is not True irrespective of whether the charging flag is False. When the first counter value is equal to or more than the minimum number of displays (No in step S23) or step S25 is finished, the flow returns to step S1.

Figure 9A:
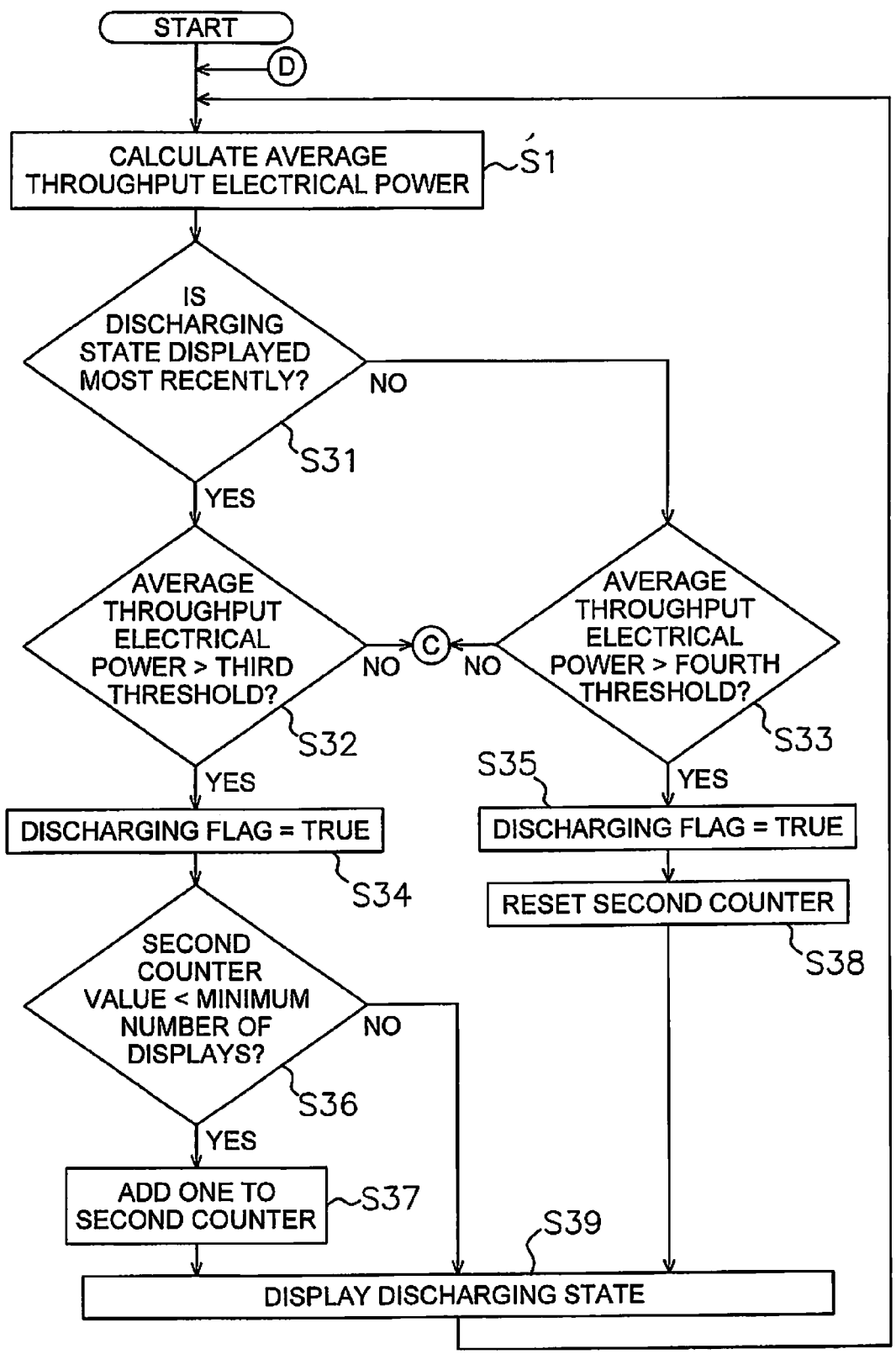
FIG. 9A is a flow chart illustrating a flow of processes where a state determination unit determines a discharging state.
Figure 9B:
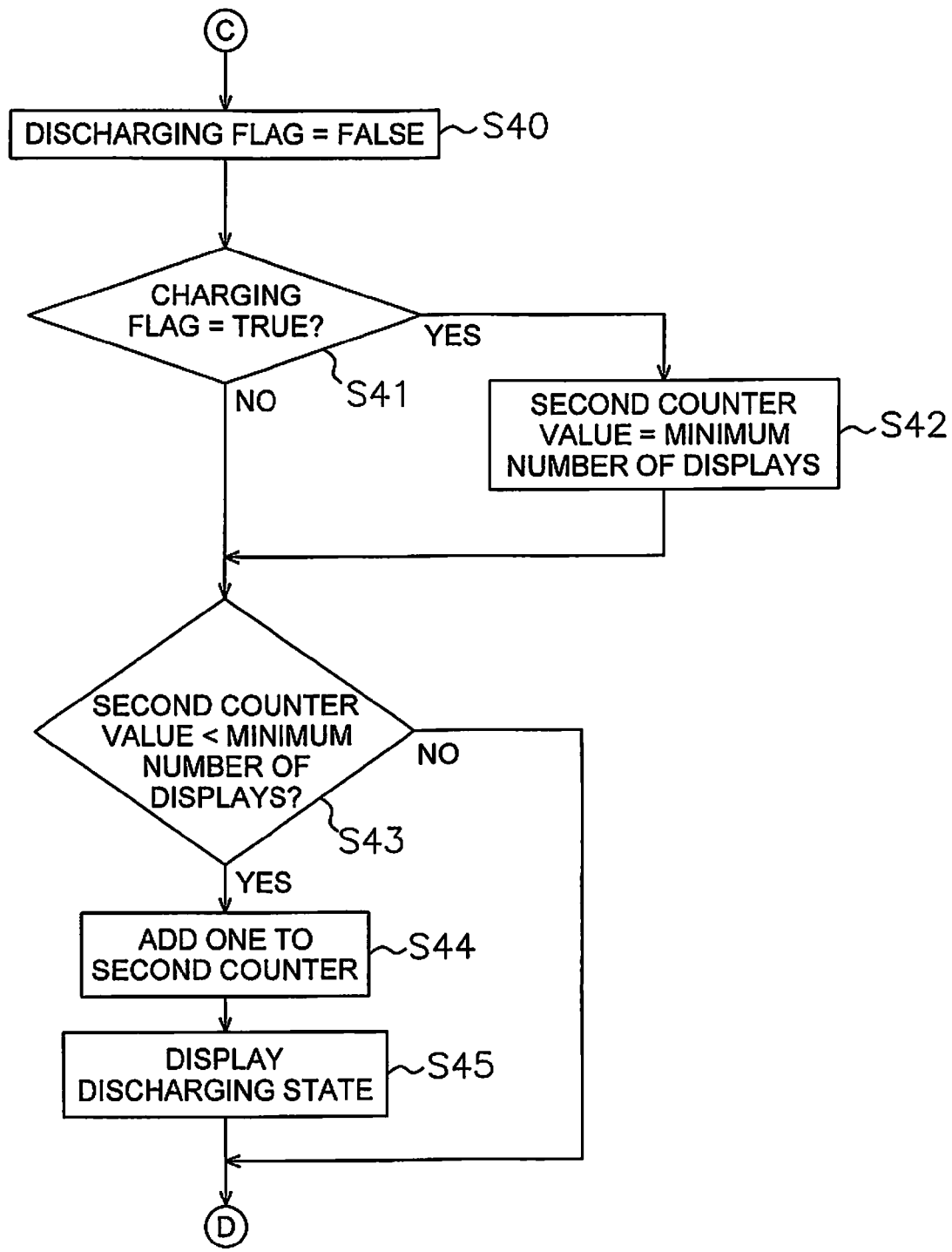
FIG. 9B is a flow chart illustrating a flow of processes where a state determination unit determines a discharging state.

FIG. 9A and FIG. 9B are flow charts illustrating a flow of processes where the state determination unit 51 determines the discharging state. Also in this case, first, in step S1, the state determination unit 51 calculates the average throughput electrical power. Next, in step S31, the state determination unit 51 determines whether or not the state display section 52 most recently displays "discharging state". In a case where "discharging state" is displayed most recently (Yes in step S31), the state determination unit 51 determines whether or not the average throughput electrical power is larger than a third threshold (step S32). In a case where "discharging state" is not displayed most recently (No in step S31), the state determination unit 51 determines whether or not the average throughput electrical power is larger than a fourth threshold (step S33). Here, the fourth threshold is larger than the third threshold and the third threshold and the fourth threshold are both positive values. That is, the absolute value of the fourth threshold is larger than the absolute threshold of the third threshold. The third threshold and the fourth threshold are values which are set in advance and are stored using the control unit 31.

In a case where the average throughput electrical power is larger than the third threshold or the fourth threshold (Yes in step S32 or Yes in step S33), a discharging flag is set to True (step S34 or step S35). In a case where the average throughput electrical power is equal to or less than the third threshold or the fourth threshold (No in step S32 or No in step S33), the discharging flag is set to False (step S40).

When step S34 is finished, the state determination unit 51 determines whether or not a second counter value is less than the minimum number of displays in step S36. Here, the second counter is a counter for measuring the time period over which "discharging state" is displayed on the state display section 52. It is possible to calculate the time period over which "discharging state" is displayed if the counter value is multiplied by the time period interval $\Delta ts$ which is executed in step S1. The minimum number of displays is a counter value that indicates the minimum time period $\Delta t2$ over which "discharging state" is continuously displayed and which is a value which is set in advance and stored using the control unit 31. Accordingly, when the second counter value is less than the minimum number of displays (Yes in step S36), this has the meaning that the minimum time period over which "discharging state" is continuously displayed has not been reached. At this time, one is added to the second counter value in step S37. In other words, the second counter is incremented by one. Then, in step S39, the state determination unit 51 determines that the state to be displayed on the state display section 52 is "discharging state" and displays "discharging state" on the state display section 52. When the second counter value is equal to or more than the minimum number of displays (No in step S36), the state determination unit 51 determines that the state to be displayed on the state display section 52 is "discharging state"

and displays "discharging state" on the state display section 52 without modifying the second counter value (step S39).

When step S35 is finished, the state determination unit 51 resets the second counter in step S38. That is, the state determination unit 51 sets the counter value of the second counter to zero. After this, the state determination unit 51 determines that the state to be displayed on the state display section 52 is "discharging state" and displays "discharging state" on the state display section 52 (step S39). After step S39 is finished, the flow returns to step S1.

When step S40 is finished, the state determination unit 51 determines whether or not the charging flag is True in step S41. When the charging flag is True (Yes in step S41), the state determination unit 51 sets the minimum number of displays as the counter value of the second counter (step S42). That is, due to steps S43 to S45 which will be described later, "discharging state" is not displayed on the state display section 52. When the charging flag is False (No in step S41) or step S42 is finished, the state determination unit 51 determines whether or not the second counter value is less than the minimum number of displays in step S43. When the second counter value is less than the minimum number of displays (Yes in step S43), one is added to the second counter in step S44. In other words, the second counter is incremented by one. After this, the state determination unit 51 determines that the state to be displayed on the state display section 52 is "discharging state" and displays "discharging state" on the state display section 52 (step S45). Due to steps S43 to S45, the state determination unit 51 determines that the discharging state (that is, the state after the change) is the state to be displayed on the state display section 52 until the predetermined time period Δt2 elapses since the state to be displayed on the state display section 52 changes to the charging state while the charging flag is not True irrespective of whether the discharging flag is False. When the second counter value is equal to or more than the minimum number of displays (No in step S43) or step S45 is finished, the flow returns to step S1.

Here, executing of steps S43 to S45 is limited to cases where both the discharging flag and the charging flag are False. Since step S19 or S39 is always executed if one out of the charging flag or the discharging flag is True, it is possible for the state determination unit 51 to determine that the state to be displayed on the state display section 52 is one out of either the charging state or the discharging state by using the first to fourth thresholds. Accordingly, executing of steps S43 to S45 is limited to cases where it is not possible for the state determination unit 51 to determine that the state to be displayed on the state display section 52 is the charging state or the discharging state by using the first to fourth thresholds. In the same manner, executing of steps S23 to S25 is limited to cases where both the discharging flag and the charging flag are False. Accordingly, executing of steps S23 to S25 is limited to cases where it is not possible for the state determination unit 51 to determine that the state to be displayed on the state display section 52 is the charging state or the discharging state by using the first to fourth thresholds.

The process for determining whether or not there is the "charging state" and the process for determining whether or not there is the "discharging state" may be executed in parallel. In this case, step S21 may be executed after the steps of either step S34, S35, and S40 are finished. In addition, step S41 may be executed after the steps of either step S14, S15, and S20 are finished.

Alternatively, the process for determining whether or not there is the "charging state" and the process for determining whether or not there is the "discharging state" may be executed in sequence. In this case, for example, the processes of step S1 to step S15 and step S20 and the processes of step S1 to step S35 and step S40 may be executed first and the processes of step S16 to step S19 and step S21 to step S25 and the processes of step S36 to step S39 and step S41 to step S45 may be executed later.

The characteristics of the work vehicle 1 according to the present exemplary embodiment will be described next. First, the effects of the state determining process using the state determination unit 51 will be described. FIGS. 10A to 10C are diagrams illustrating examples of charging display and discharging display in a case where the state determining process according to the present embodiment is not performed. FIG. 10A shows changes in vehicle speed of the work vehicle 1 in a case where the work vehicle 1 performs certain work. This work is work where cargo, such as sand, is dug up and loaded onto the cargo bed of a dump truck. The work vehicle 1 is moving forward from time 0 to t1. The work vehicle 1 is digging while moving forward from time t1 to t2. The work vehicle 1 is reversing from time t2 to t4. The work vehicle I approaches the dump truck while moving forward and (referred to below as "approaching dump truck") and lowers the cargo from the bucket 12 onto the cargo bed of the dump truck (refer to below as "dumping") from time t4 to t6. The work vehicle 1 performs a so-called shuttle operation of switching to the forward clutch CF while reversing from time t3 to t5. The work vehicle 1 reverses from time t6 to t8. The work vehicle 1 moves forward from t8 and beyond. The work vehicle 1 performs a so-called shuttle operation of switching to the forward clutch CF while reversing from time t7 to t9.

FIG. 10B shows changes over time in the electrical power which passes through the booster BT when the work vehicle 1 performs the work in FIG. 10A. Here, charging of the capacitor 64 is indicated in a case where the electrical power is positive. Then, discharging of the capacitor 64 is indicated in a case where the electrical power is negative. The work vehicle I is different from a typical automobile and output from the engine is utilized for operations by the working implement 3. Accordingly, variation in electrical power due to charging and discharging of the capacitor 64 is more severe than with a typical automobile. For this reason, there are states where variation in electrical power changes in spikes.

FIG. 10C shows an example of performing charging display and discharging display on the basis of the variation in electrical power in FIG. 10B. In this example, there is discharging display in a case where electrical power has a positive value in FIG. 1 OB and there is charging display in a case where electrical power has a negative value in FIG. 10B. If there is a case where charging display and discharging display as shown in FIG. 10C is displayed to an operator, it is difficult for the operator to visually confirm switching between discharging and charging over short time periods.

FIGS. 11A to 11E show examples of charging display and discharging display in a case where a state determining process according to the present embodiment is performed. FIG. 11A shows changes in vehicle speed in the same manner as FIG. 10A. FIG. 11 B displays the average values (average throughput electrical power) of the voltage in FIG. 10B per the predetermined time period Δt1. In this case, Δt1 is 0.5 seconds. According to these processes, sharp variation in spikes which are seen in FIG. 10B are eliminated and variation in electrical power is smooth.

FIG. 11C shows an example of performing charging display and discharging display on the basis of the variation of the average throughput electrical power in FIG. 11 B. In this example, there is discharging display in a case where the average throughput electrical power has a positive value FIG. 11 B and there is charging display in a case where the average throughput electrical power has a negative value in FIG. 11 B. The average throughput electrical power from time tl to t4 in FIG. 11B is close to zero and frequently changes between positive and negative. For this reason, from time tl to t4, it is particularly difficult for the operator to visually confirm switching between discharging and charging over short time periods.

FIG. 11D shows the results when processes of steps S12, S13, S32, and S33 are added. Due to this, frequent switching between charging display and discharging display over a short time period is prevented by adding hysteresis to the method for determining by using the first threshold to the fourth threshold even when the average throughput electrical power is close to zero and frequently changes between positive and negative. However, by adding hysteresis, there is charging display and discharging display over extremely short time periods, such as the time segments which are shown by (i), (ii), and (iii) in FIG. 11D since the length of the time period when charging display is determined and the length of the time period when discharging display is determined are shortened.

FIG. 11E shows the results when processes of steps S16 to S18, S22 to S25, S36 to S38, and S42 to S45 are also added in addition to the processes in FIG. 11D. Due to this, charging display and discharging display are only performed for the minimum which is the time period Δt2. Specifically, Δt2 is one second. Due to this, it not being possible for the operator to visually confirm charging display and discharging display due to charging display and discharging display over extremely short periods is prevented.

Due to the above, the operator is able to easily visually confirm that the capacitor 64 is in the charging state or the discharging state even with the work vehicle 1 where variation in electrical power due to charging and discharging of the capacitor 64 is more severe than a typical automobile.

Furthermore, the electricity storage amount display section 53 includes at least three bar elements. Workability is reduced if there is insufficient charging soon after the state where there is one of the bar elements which is lighted. However, in the electricity storage amount display section 53, the gap between the largest electricity storage amount and the lowest electricity storage amount in the capacitor 64 in a state where one of the bar elements is lighted is larger than the gap between the largest electricity storage amount and the lowest electricity storage amount in the capacitor 64 in a state where any of two or more of the bar elements which are lighted. Accordingly, reducing of workability described above is prevented. Furthermore, with the voltage which is normally used in the capacitor 64, the gap between the largest electricity storage amount and the lowest electricity storage amount is small and bar elements which correspond to the electricity storage amount are provided. Accordingly, it is possible for an operator to easily determine whether the electricity storage amount in the capacitor 64 is more than or less than the normal charging amount.

The first display element 55 showing that the capacitor 64 is in the charging state is arranged on the first side of the electricity storage amount display section 53 and the second display element 56 showing that the capacitor 64 is in the discharging state is arranged on the second side of the electricity storage amount display section 53. Accordingly, ease of visual confirmation is improved for an operator since the positions for displaying the charging state and the discharging state are different. Here, when the first display element 55 and the second display element 56 are arranged at positions which are symmetrical with respect to the electricity storage amount display section 53 as shown in FIG. 5 and the like, it is even easier for an operator to identify the charging state and the discharging state. In addition, the color which is displayed by the first display element 55 and the color which is displayed by the second display element 56 are different. For this reason, it is even easier for an operator to identify the charging state and the discharging state.

The state display section 52 displays the arrow head which heads toward the electricity storage amount display section 53 in a case where the capacitor 64 is in the charging state. The state display section 52 displays the arrow head which heads toward the direction which is the opposite to the direction which heads toward the electricity storage amount display section 53 in a case where the capacitor 64 is in the discharging state. It is easier for an operator to visually grasp the charging state due to the arrow head which heads toward the electricity storage amount display section 53. In addition, it is easier for an operator to visually grasp the discharging state due to the arrow head which heads toward the direction which is the opposite to the direction which heads toward the electricity storage amount display section 53 in a case where the capacitor 64 is in the discharging state. For this reason, it is even easier for an operator to identify the charging state and the discharging state.

In a case where the capacitor 64 is in the charging state, the state display section 52 displays the movement of the lighted element pieces of the first display element 55 in order from the element piece 55c which is farthest from the electricity storage amount display section 53 toward the element piece 55a which is closest to the electricity storage amount display section 53. Due to this, it is easier for an operator to grasp that electrical power is being output toward the capacitor 64 in a case where the capacitor 64 is in the charging state. For this reason, it is even easier for an operator to identify the charging state.

In addition, in a case where the capacitor 64 is in the discharging state, the state display section 52 displays the movement of the lighted element pieces of the second display element 56 in order from the element piece 56c which is closest to the electricity storage amount display section 53 toward the element piece 56a which is farthest from the electricity storage amount display section 53. Due to this, it is easier for an operator to grasp that electrical power is being output from the capacitor 64 in a case where the capacitor 64 is in the discharging state. For this reason, it is even easier for an operator to identify the discharging state.

One exemplary embodiment of the present invention is described above but the present invention is not limited to the exemplary embodiment described above and various modifications are possible within a scope which does not depart from the gist of the invention.

The processes of steps S12, S13, S32, and S33 in FIG. 8A and FIG. 9A are executed by using the average throughput electrical power where the electrical power which are output from the capacitor 64 to the inverters I1, I2, and I3 are positive and the electrical power which are output from the capacitor 64 to the inverters I1, I2, and I3 are negative. However, in a case of using the average throughput electrical power where the electrical power which are output from the capacitor 64 to the inverters I1, I2, and I3 are negative and the electrical power which are output from the capacitor 64 to the inverters I1, I2, and I3 are positive, the magnitude relation of the average throughput electrical power and the first to fourth thresholds are reversed in steps S12, S13, S32, and S33. That is, in step S12, the state determination unit 51 determines whether or not the average throughput electrical power is larger than the first threshold. Step S14 is executed in a case where the average throughput electrical power is larger than the first threshold. In step S13, the state determination unit 51 determines whether or not the average throughput electrical power is larger than the second threshold. Step S15 is executed in a case where the average throughput electrical power is larger than the second threshold. In step S32, the state determination unit 51 determines whether or not the average throughput electrical power is less than the third threshold. Step S34 is executed in a case where the average throughput electrical power is less than the third threshold. In step S33, the state determination unit 51 determines whether or not the average throughput electrical power is less than the fourth threshold. Step S35 is executed in a case where the average throughput electrical power is less than the fourth threshold.

In the exemplary embodiment described above, the state determination unit 51 determines the charging state or the discharging state on the basis of the electrical power which passes through the booster BT, but the state determination unit 51 may determine the charging state or the discharging state by using other parameters. For example, it is possible to consider current which flows into the capacitor 64, current which flows out of the capacitor 64, changes in the voltage of the capacitor 64, and the like as the parameter that indicates electricity which is supplied to the capacitor 64 or electricity which is discharged from the capacitor 64. In addition, in a case where a battery is used instead of the capacitor 64, current which flows into the battery or current which flows out of the battery may be used as the parameter in this case since the booster BT will be unnecessary. The state determination unit 51 may determine the charging state or the discharging state using the parameter in this manner. At this time, determining in steps S12, S13, S32, and S33 are executed as the same processes as in FIG. 8A and FIG. 9A in a case when the parameter is a positive value when electricity is discharged from the capacitor 64 and the parameter is a negative value when electricity flows into the capacitor 64. However, at this time, the magnitude relation of the parameter and the first to fourth thresholds as described above are reversed in steps S12, S13, S32, and S33 in a case when the parameter is a negative value when electricity is discharged from the capacitor 64 and the parameter is a positive value when electricity flows into the capacitor 64. Here, the first threshold to the fourth threshold which correspond to the parameter are set in advance in a case where another parameter is used.

In addition, the following processes may be performed instead of step S22 and step S42 in FIG. 8B and FIG. 9B being executed. When the discharging flag is True (Yes in step S21), the flow may proceed to step S1. In addition, when the charging flag is True (Yes in step S41), the flow may proceed to step S1.

The shape of the elements in the electricity storage amount display section 53 need not be a bar shape. For example, the shape of the elements in the electricity storage amount display section 53 may be an arc shape such as with the fuel gauge 58.

The configuration of the power transmission apparatus 24 is not limited to the configuration in the exemplary embodiment described above. For example, the linking and arrangement of each element in the two planetary gear mechanisms 68 and 69 are not limited to the linking and arrangement in the exemplary embodiment described above. The number of the planetary gear mechanisms is not limited to two. For example, the power transmission apparatus may be provided with one planetary gear mechanism. The number of the motors is not limited to three. For example, the third motor MG3 may be omitted. In addition, the positioning of the first to third motors MG1 to MG3 are not limited to the positioning in the exemplary embodiment described above and may be modified.

The power transmission apparatus is not limited to a so-called split hybrid system where the planetary gear mechanisms are used as described above. An apparatus with a so-called series hybrid system or a parallel hybrid system may be adopted as the power transmission apparatus.

According to the exemplary embodiments of the present invention, it is possible to propose a work vehicle and a work vehicle control method where an operator is able to easily visually confirm that an electricity storage apparatus is in an electricity storing state or an electricity discharging state.

The invention claimed is:

1. A work vehicle comprising:
an engine;
a working implement;
a travelling apparatus driven by the engine;
a power transmission apparatus configured to transfer a driving force from the engine to the travelling apparatus, the power transmission apparatus including an input shaft, an output shaft, and a motor;
an electricity storage apparatus configured to store electricity generated by the motor;
a state display section configured to display whether the electricity storage apparatus is in a charging state or a discharging state; and
a state determination unit configured to determine the state to be displayed on the state display section on the basis of a parameter corresponding to electricity supplied to the electricity storage apparatus or electricity discharged from the electricity storage apparatus;
the power transmission apparatus being configured so that a rotation speed ratio of the output shaft with respect to the input shaft is changed by changing of a rotation speed of the motor,
the state determination unit being configured to
determine whether or not to set the state to be displayed on the state display section to the charging state based on the magnitude relation of a first threshold and the parameter when the state displayed on the state display section most recently is the charging state;
determine whether or not to set the state to be displayed on the state display section to the charging state based on the magnitude relation of a second threshold different from the first threshold and the parameter when the state displayed on the state display section most recently is not the charging state;
determine whether or not to set the state to be displayed on the state display section to the discharging state based on the magnitude relation of a third threshold and the parameter when the state displayed on the state display section most recently is the discharging state; and
determine whether or not to set the state to be displayed on the state display section to the discharging state based on the magnitude relation of a fourth threshold different from the third threshold and the parameter when the state displayed on the state display section most recently is not the discharging state, until a predetermined first time period elapses since the state to be displayed on the state display section changes to the charging state or the discharging state, the state determination section being configured to determine the state after the change as the state to be displayed on the state display section in a case where the state determination unit cannot determine to set the state to be displayed on the state display section to either of the charging state or the discharging state by using the first to the fourth thresholds.

2. The work vehicle according to claim 1, wherein
in a case where the parameter is a positive value when electricity is discharged from the electricity storage apparatus and the parameter is a negative value when electricity is supplied to the electricity storage apparatus,
the state determination unit is configured to
determine to set the state to be displayed on the state display section to the charging state in a case where the parameter is smaller than the first threshold when the state displayed on the state display section most recently is the charging state;
determine to set the state to be displayed on the state display section to the charging state in a case where the parameter is smaller than the second threshold when the state displayed on the state display section most recently is not the charging state;
determine to set the state to be displayed on the state display section to the discharging state in a case where the parameter is larger than the third threshold when the state displayed on the state display section most recently is the discharging state; and
determine to set the state to be displayed on the state display section to the discharging state in a case where the parameter is larger than the fourth threshold when the state displayed on the state display section most recently is not the discharging state.

3. The work vehicle according to claim 1, wherein
in a case where the parameter is a positive value when electricity is supplied to the electricity storage apparatus and the parameter is a negative value when electricity is discharged from the electricity storage apparatus,
the state determination unit is configured to:
determine to set the state to be displayed on the state display section to the charging state in a case where the parameter is larger than the first threshold when the state displayed on the state display section most recently is the charging state;
determine to set the state to be displayed on the state display section to the charging state in a case where the parameter is larger than the second threshold when the state displayed on the state display section most recently is not the charging state;
determine to set the state to be displayed on the state display section to the discharging state in a case where the parameter is smaller than the third threshold when the state displayed on the state display section most recently is the discharging state; and
determine to set the state to be displayed on the state display section to the discharging state in a case where the parameter is smaller than the fourth threshold when the state displayed on the state display section most recently is not the discharging state.

4. The work vehicle according to claim 1, wherein
the absolute value of the second threshold is larger than the absolute value of the first threshold, and
the absolute value of the fourth threshold is larger than the absolute value of the third threshold.

5. The work vehicle according to claim 1, wherein
the parameter electrical power charged onto or discharged from the electricity storage unit.

6. The work vehicle according to claim 5, further comprising
a booster configured to convert a voltage of the electricity storage apparatus to a predetermined voltage,
the parameter being electrical power passing through the booster.

7. The work vehicle according to claim 1, wherein
the parameter is an average value of electrical power, which is charged onto or discharged from the electricity storage unit, for a predetermined second time period.

8. The work vehicle according to claim 7, further comprising
a booster configured to convert a voltage of the electricity storage apparatus to a predetermined voltage,
the parameter being an average value of electrical power passing through the booster for the predetermined second time period.

9. The work vehicle according to claim 1, further comprising
an electricity storage amount display section configured to display the amount of electricity stored in the electricity storage apparatus,
the electricity storage amount display section including at least three elements and showing the amount of electricity stored in the electricity storage apparatus by means of a number of the elements which are lighted.

10. The work vehicle according to claim 9, wherein
a gap between the largest electricity storage amount and the lowest electricity storage amount in the electricity storage apparatus in a state where one of the elements is lighted is larger than a gap between the largest electricity storage amount and the lowest electricity storage amount in the electricity storage apparatus in a state where any of two or more of the elements are lighted.

11. The work vehicle according to claim 9, wherein
the state display section includes
a first display element configured to show that the electricity storage apparatus is in the charging state, and
a second display element configured to show that the electricity storage apparatus is in the discharging state,
the first display element is arranged on a first side of the electricity storage amount display section, and
the second display element is arranged on a second side of the electricity storage amount display section.

12. The work vehicle according to claim 11, wherein
the state display section is configured to display in the charging state, an arrow or an arrow head heading toward the electricity storage amount display section and display in the discharging state, an arrow or an arrow head heading toward a direction opposite to the direction that heads toward the electricity storage amount display section.

13. The work vehicle according to claim 11, wherein
each of the first display element and the second display element includes three or more element pieces, and the state display section is configured to display the charging state by moving the lighted element pieces of the first display element in order from the farthest element piece from the electricity storage amount display section toward the closest element piece to the electricity storage amount display section during the charging state and display the discharging state by moving the lighted element pieces of the second display element in order from the closest element piece to the electricity storage amount display section toward the farthest element piece from the electricity storage amount display section during the discharging state.

14. The work vehicle according to claim 13, wherein the first display element and the second display element are not lighted at the same time.

15. The work vehicle according to claim 11, wherein colors which are displayed by the first display element and the second display element are different.

16. A method for controlling a work vehicle, which is provided with an engine, a working implement, a travelling apparatus driven by the engine, a power transmission apparatus configured to transfer driving force from the engine to the travelling apparatus, the power transmission apparatus including an input shaft, an output shaft, and a motor, an electricity storage apparatus configured to store electricity generated by the motor, a state display section configured to display whether the electricity storage apparatus is in a charging state or a discharging state, and the power transmission apparatus being configured so that a rotation speed ratio of the output shaft with respect to the input shaft is changed by changing of the rotation speed of the motor, the method comprising:

a step of determining the state to be displayed on the state display section on the basis of a parameter corresponding to electricity supplied to the electricity storage apparatus or electricity discharged from the electricity storage apparatus, the step of determining the state to be displayed including
a sub-step of determining whether or not to set the state to be displayed on the state display section to the charging state based on the magnitude relation of a first threshold and the parameter when the state displayed on the state display section most recently is the charging state;
a sub-step of determining whether or not to set the state to be displayed on the state display section to the charging state based on the magnitude relation of a second threshold different from the first threshold and the parameter when the state displayed on the state display section most recently is not the charging state;
a sub-step of determining whether or not to set the state to be displayed on the state display section to the discharging state based on the magnitude relation of a third threshold and the parameter when the state displayed on the state display section most recently is the discharging state;
a sub-step of determining whether or not to set the state to be displayed on the state display section to the discharging state based on the magnitude relation of a fourth threshold different from the third threshold and the parameter when the state displayed on the state display section most recently is not the discharging state; and
a sub-step of, until a predetermined first time period elapses since the state to be displayed on the state display section changes to the charging state or the discharging state, determining the state after the change as the state to be displayed on the state display section in a case where it is not possible to determine to set the state to be displayed on the state display section to either of the charging state or the discharging state by using the first to the fourth thresholds.

* * * * *